United States Patent
Gruner et al.

(10) Patent No.: US 11,692,586 B2
(45) Date of Patent: Jul. 4, 2023

(54) SELF-ALIGNING LOW LOAD SHEAR OUT JOINT

(71) Applicant: The Boeing Company, Chicago, IL (US)

(72) Inventors: Bryan J. Gruner, Bellevue, WA (US); John Thomas B. Homrich, Seattle, WA (US)

(73) Assignee: Ths Boeing Company, Chicago, IL (US)

( * ) Notice: Subject to any disclaimer, the term of this patent is extended or adjusted under 35 U.S.C. 154(b) by 858 days.

(21) Appl. No.: 16/550,699

(22) Filed: Aug. 26, 2019

(65) Prior Publication Data
US 2021/0062848 A1    Mar. 4, 2021

(51) Int. Cl.
*F16C 11/04*    (2006.01)
*B64C 9/02*    (2006.01)

(52) U.S. Cl.
CPC .............. *F16C 11/045* (2013.01); *B64C 9/02* (2013.01); *Y10T 403/32861* (2015.01)

(58) Field of Classification Search
CPC . B64C 9/02; F16C 11/045; F16D 9/06; Y10T 403/11; Y10T 403/32861; Y10T 403/32877; Y10T 403/32896; Y10T 403/32918; Y10T 403/32926
USPC .................................................. 464/32, 33
See application file for complete search history.

(56) References Cited

U.S. PATENT DOCUMENTS

| | | | | |
|---|---|---|---|---|
| 4,196,799 A | * | 4/1980 | Taylor | F02N 11/10 74/6 |
| 4,543,074 A | * | 9/1985 | Ville | F16D 9/06 464/33 |
| 5,823,473 A | * | 10/1998 | Odell | B64C 1/1415 244/129.5 |
| 6,760,948 B2 | * | 7/2004 | Schmitt | B08B 9/045 254/134.3 FT |
| 8,844,866 B2 | * | 9/2014 | De Azevedo | B64C 1/36 244/137.4 |
| 9,777,639 B2 | * | 10/2017 | Davis | F01D 21/045 |
| 10,640,194 B2 | * | 5/2020 | Zimmerman | F16C 11/045 |
| 10,830,099 B2 | * | 11/2020 | Long | F01D 25/162 |
| 11,447,233 B2 | * | 9/2022 | Gruner | B64C 9/02 |

FOREIGN PATENT DOCUMENTS

| | | | | |
|---|---|---|---|---|
| JP | H0610188 Y2 | * | 3/1994 | ............ F16C 11/045 |
| JP | 09273539 A | * | 10/1997 | ............... B64C 9/20 |
| JP | 3660530 B2 | * | 6/2005 | ............ F16C 11/045 |
| WO | WO-2017201267 A1 | * | 11/2017 | ............... B64C 9/20 |

* cited by examiner

*Primary Examiner* — Josh Skroupa
(74) *Attorney, Agent, or Firm* — Felix L. Fischer

(57) ABSTRACT

A self-aligning support incorporates a support attachment fitting and a rotatable pin assembly having a primary load pin coupling the support attachment fitting to an attachment support, and inboard and outboard attachment claws engaged to end portions of the primary load pin. The rotatable pin assembly is configured to rotate relative to the support attachment fitting. At least one fuse pin extends through the primary load pin to limit translation of the primary load pin relative to the inboard and outboard claws.

20 Claims, 27 Drawing Sheets

SELF-ALIGNING LOW LOAD SHEAR OUT JOINT

REFERENCE TO RELATED APPLICATIONS

This application is copending with application Ser. No. 16/550,675 filed on Aug. 26, 2019 entitled LOW LOAD SHEAR OUT AUXILIARY SUPPORT JOINT and issued as U.S. Pat. No. 11,447,233 on Sep. 20, 2022 having a common assignee with the present application, the disclosure of which is incorporated herein by reference.

BACKGROUND INFORMATION

Field

This disclosure relates generally to the field of aircraft flap systems and, more particularly to a flap deployment system having an auxiliary support with self-aligned fuse pins for jam mitigation.

Background

Aircraft employ flaps and leading edge slats which deploy to increase camber and chord of the wings for enhanced aerodynamic efficiency in take-off and landing. In modern flap configurations, one or more auxiliary flap supports or deflection control tracks may be used to balance loads or prevent excessive flap box deflection under load, such tracks should not inhibit the ability of the flap to extend and retract during operation. Furthermore, such tracks should not be the cause of an inadvertent mechanical jam which could lead to less than optimal performance of the flaps. In prior systems fuse pins have been employed to yield or shear at a specific load, and thus enable controlled separation of auxiliary track and flap while allowing the main support tracks and actuators to operate the flap. However, these fuse pins are typically sized for high deployment loads, resulting in correspondingly high fusing loads. This involves surrounding structure that is sufficiently strong and rigid enough to impart requisite fusing forces to enable controlled separation. However, with certain arrangements of auxiliary supports, the typical deployment load can be an appreciable portion of the total load on the flap. Therefore, the fusing loads may substantially impact the overall design of the flap and may be the principle sizing load case for the flap, adding considerable weight and cost to the flap and support structure.

SUMMARY

Exemplary implementations of a self-aligning support incorporate a support attachment fitting and a rotatable pin assembly having a primary load pin coupling the support attachment fitting to an attachment support, and inboard and outboard attachment claws engaged to end portions of the primary load pin. The rotatable pin assembly is configured to rotate relative to the support attachment fitting. At least one fuse pin extends through the primary load pin to limit translation of the primary load pin relative to the inboard and outboard claws.

The exemplary implementations provide a method for fusing of shear out loading on a flap support attachment fitting and accommodating variation in load direction. Operating loads on a flap are reacted with a primary load pin coupling an attachment support to a flap support attachment fitting with inboard and outboard attachment claws. A pin assembly with an axis of the primary load pin eccentric from a rotational axis of the inboard and outboard attachment claws is rotated to accommodate variation in load direction. Flap deployment loads induced on the primary load pin are reacted with at least one fuse pin extending through the primary load pin to limit translation of the primary load pin relative to the flap support attachment fitting.

BRIEF DESCRIPTION OF THE DRAWINGS

The features, functions, and advantages that have been discussed can be achieved independently in various implementations of the present invention or may be combined in yet other implementations further details of which can be seen with reference to the following description and drawings.

DETAILED DESCRIPTION

The implementations described herein provide a flap attachment fitting and a self-aligning fuse pin arrangement for an auxiliary flap support that overcomes the issues in the existing structures. While the example implementations described herein address an auxiliary flap support application, leading edge slats, primary flap tracks, auxiliary flap tracks, and deflection control tracks are also applicable configurations for use of the implementations. In the example implementations, an auxiliary track is coupled to the flap support attachment fitting with a primary load pin contained within slots in claws in the flap support attachment fitting. The primary load pin is prevented from translating from the nominal position in the slots by one or more key pins, which also serve as a low-load fuse pins, enabling substantial reduction in fusing load in the event that the auxiliary track becomes jammed, and the flaps are commanded to either retract or deploy. The claws, primary load pin and fuse pins are configured in a rotating pin assembly to self-align responsive to alteration of the primary load direction.

Figure 1A:
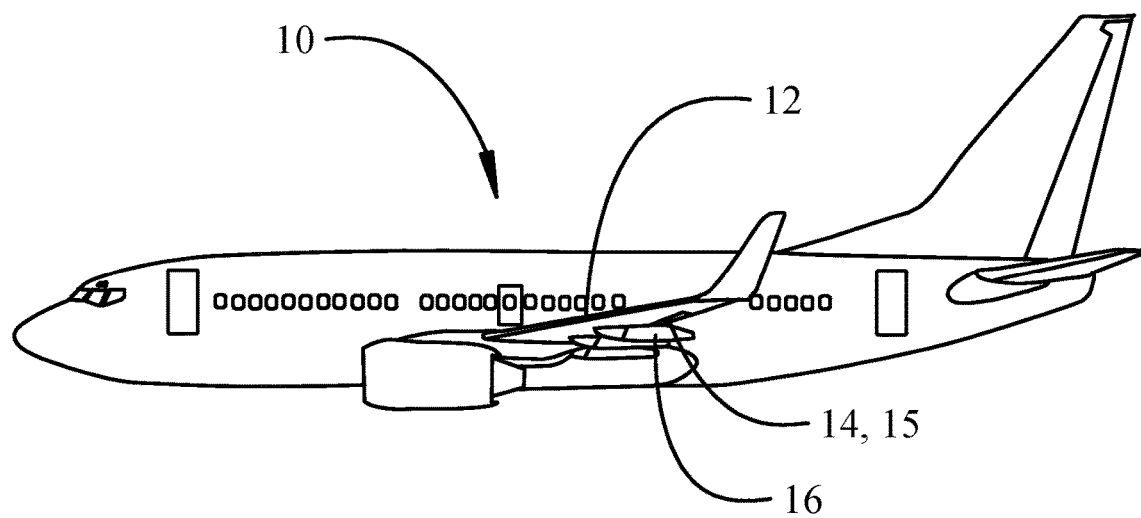
FIG. 1A is a representation of an aircraft in which the implementations disclosed herein may be employed.
Figure 1B:
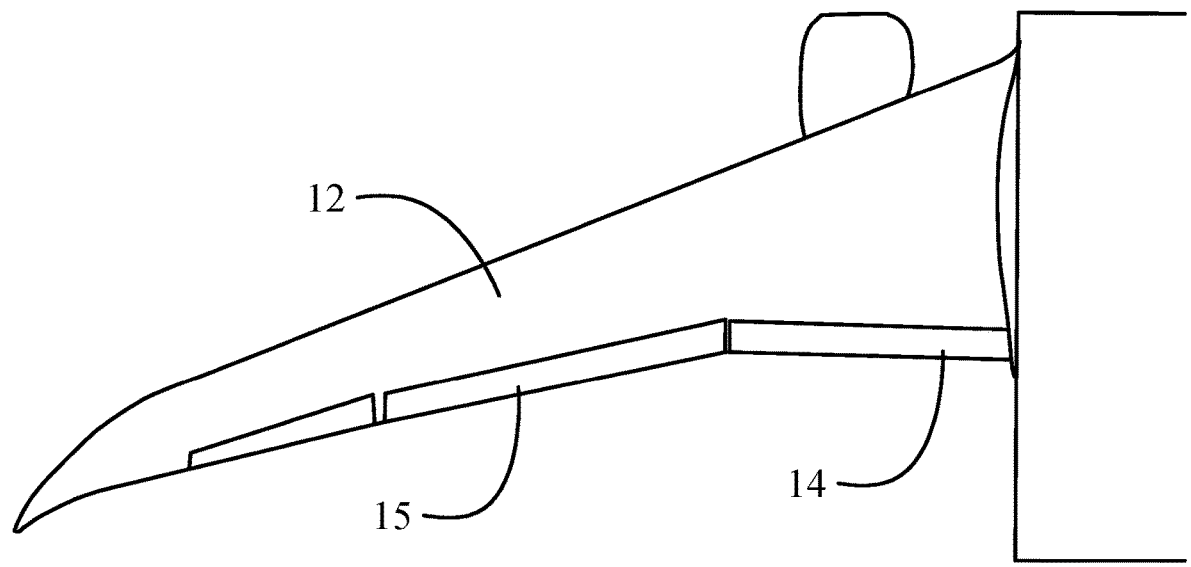
FIG. 1B is a top view of the wing and flaps of FIG. 1A.
Figure 2A:
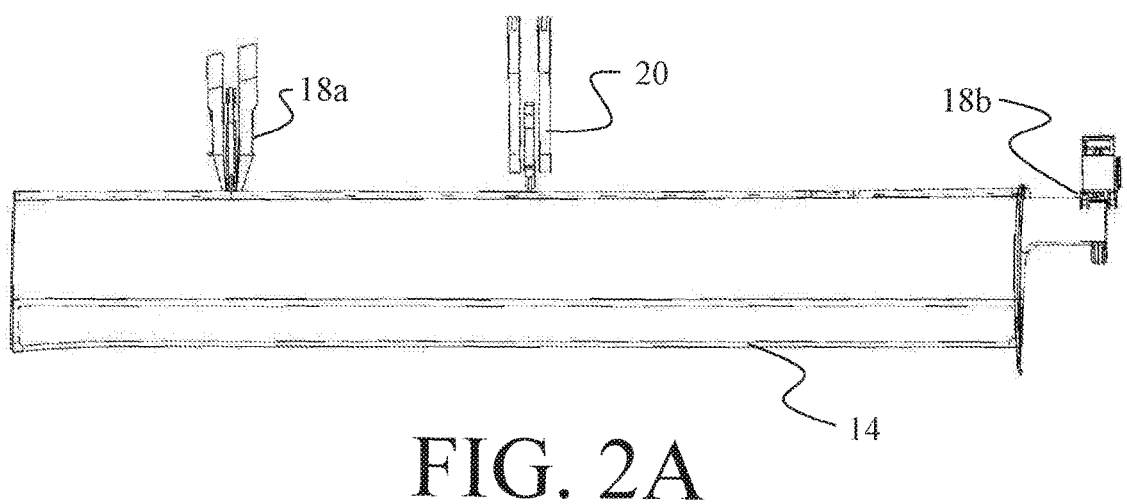
FIG. 2A is a top view of the inboard flap and supports.
Figure 2B:
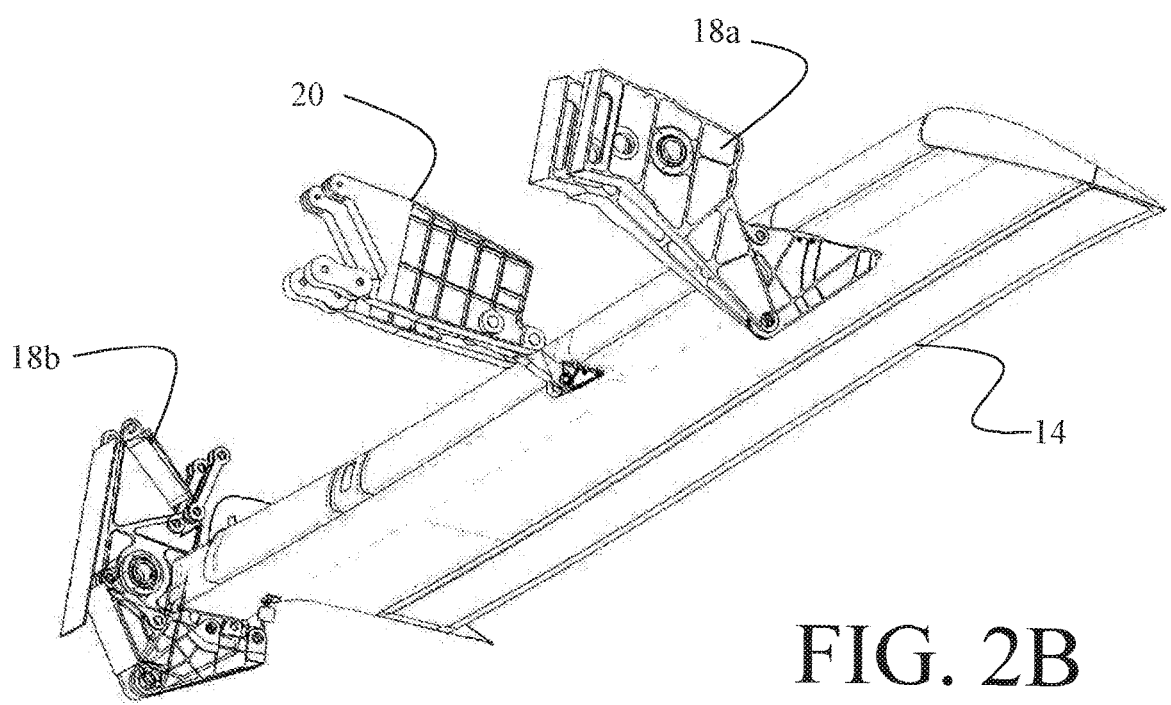
FIG. 2B is a lower front pictorial view of the main flap and supports.

Referring to the drawings, FIGS. 1A-1B depict an aircraft 10 having a wing 12 with an operating flap system, for the example shown, inboard flap 14 and outboard flap 15. The flaps 14, 15 are engaged to the wing 12 with multiple attachment supports partially housed within fairings 16. Extension of the flaps 14, 15 to enhance aerodynamic performance during takeoff and landing is accomplished with a flap deployment system that causes the flaps 14, 15 to rotate aft and downward relative to the wing 12. The attachment supports for the inboard flap 14 are shown in FIGS. 2A and 2B. While described herein with respect to a flap system and specifically the inboard flap 14, the implementations are equally applicable to outboard flap 15 or other deployed structures of the airplane whose primary load direction rotates relative to the attachment fitting such as leading edge slats. The terms "inboard" and "outboard" are employed to describe relative positioning and other than for the specific implementations disclosed may be substituted with appropriate descriptors such as "first" and "second", "upper" and "lower" or "right" and "left". In the example configuration shown in the drawings, flap 14 is supported by an outboard primary support 18a, with an actuator driven mechanism, and an inboard primary support 18b, also having an actuator driven mechanism. A passively operating midspan auxiliary support 20 provides deflection control and balances the loads on the flap intermediate the two primary supports.

Figure 3A:
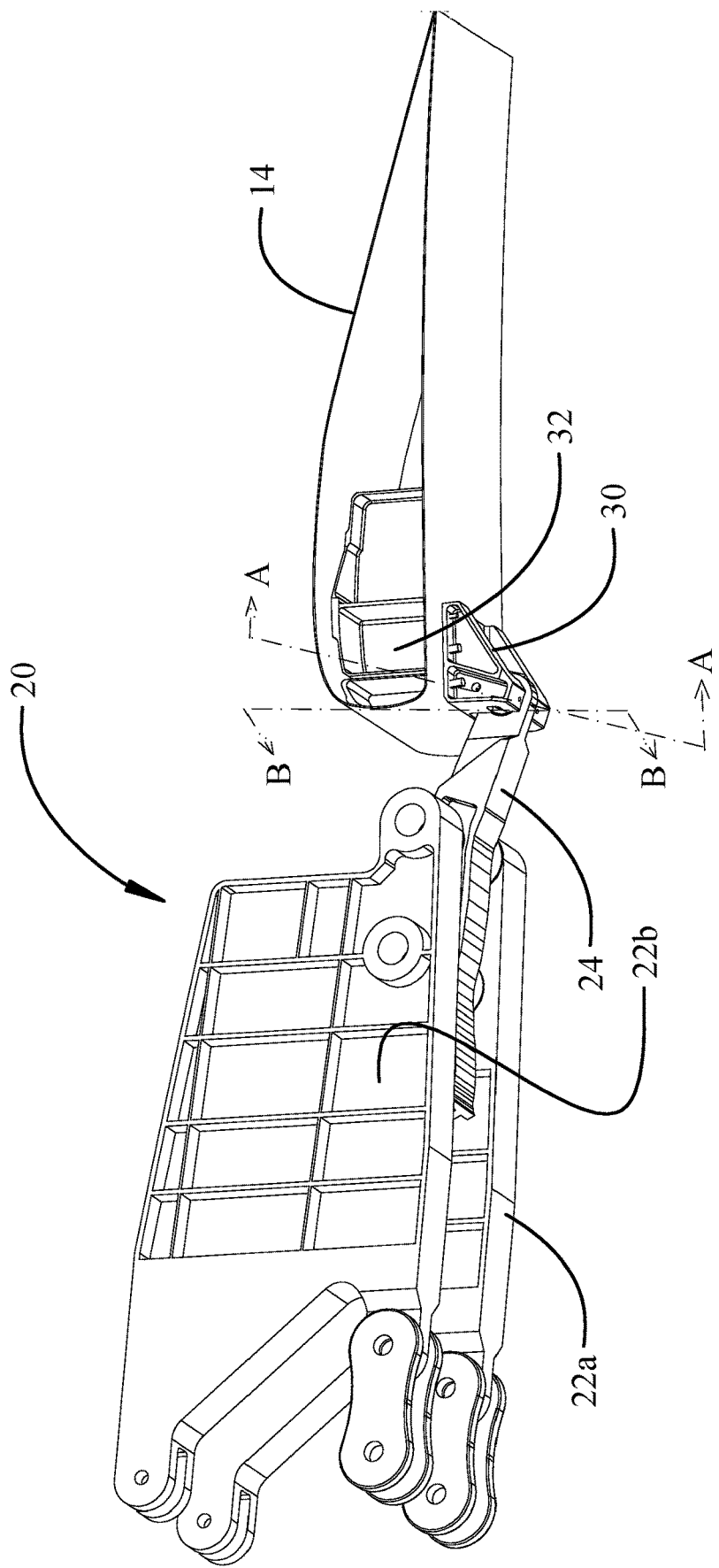
FIG. 3A is a lower front pictorial view of the auxiliary support as attached to the flap.
Figure 3B:
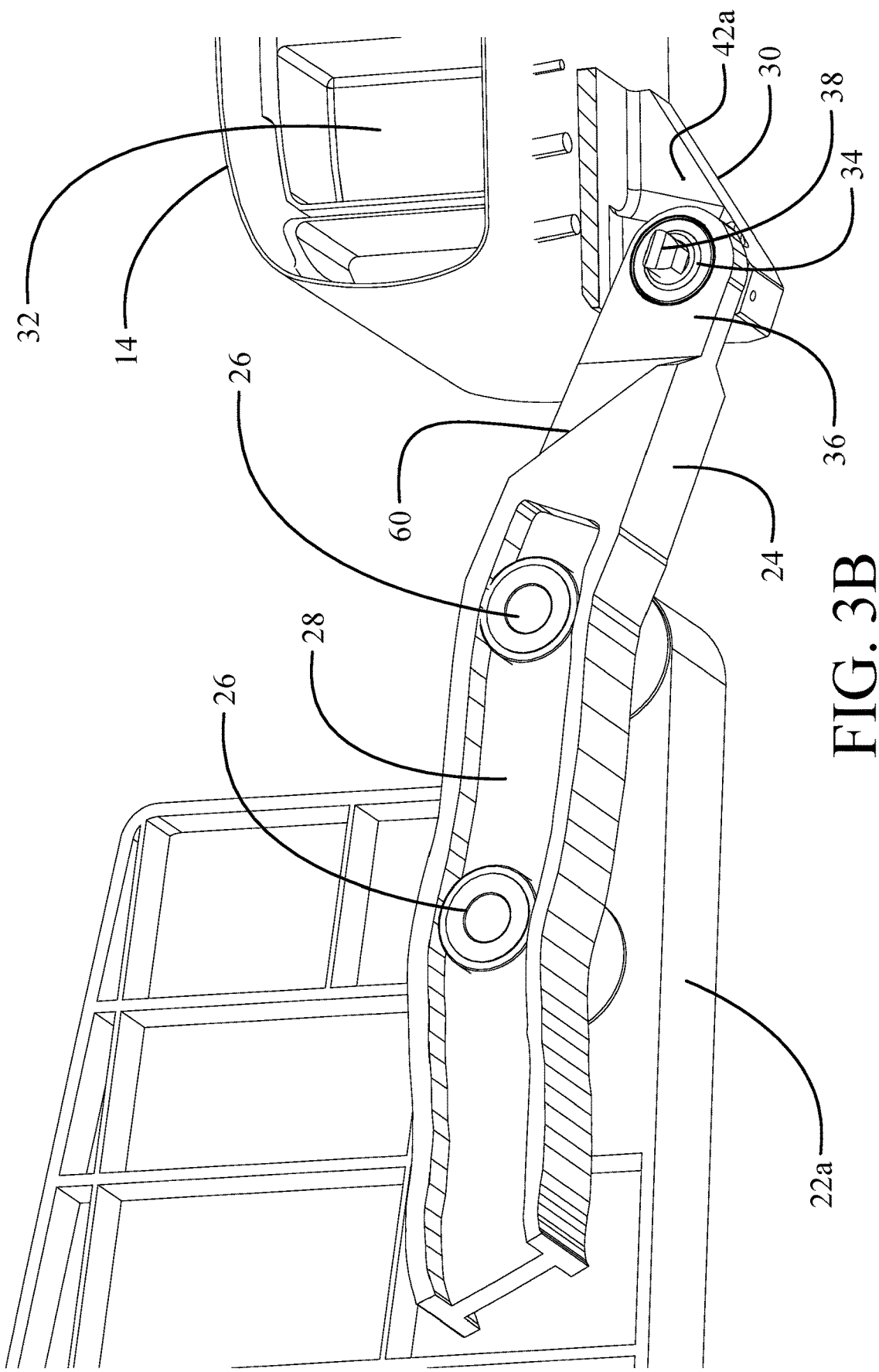
FIG. 3B is a detailed pictorial view of the auxiliary support with the outboard support rib removed to display the track and the flap support sectioned along line A-A in FIG. 3A to show the load pin and bearing.

FIGS. 3A and 3B show details of the auxiliary support 20 which employs inboard and outboard support ribs 22a, 22b attached to structure of the wing 12. An auxiliary flap support track 24 is engaged between the support ribs 22a, 22b on rollers 26 received in extension profile cutouts 28 (best seen in FIG. 3B with the outboard support rib removed for clarity). A flap support attachment fitting 30 is mounted to structural supports in the flap 14, such as flap rib 32 for the example in the drawings. A spherical bearing 34 in an aft lug 36 of the auxiliary flap support track 24 is engaged by a primary load pin 38 carried in the flap support attachment fitting 30.

Figure 4A:
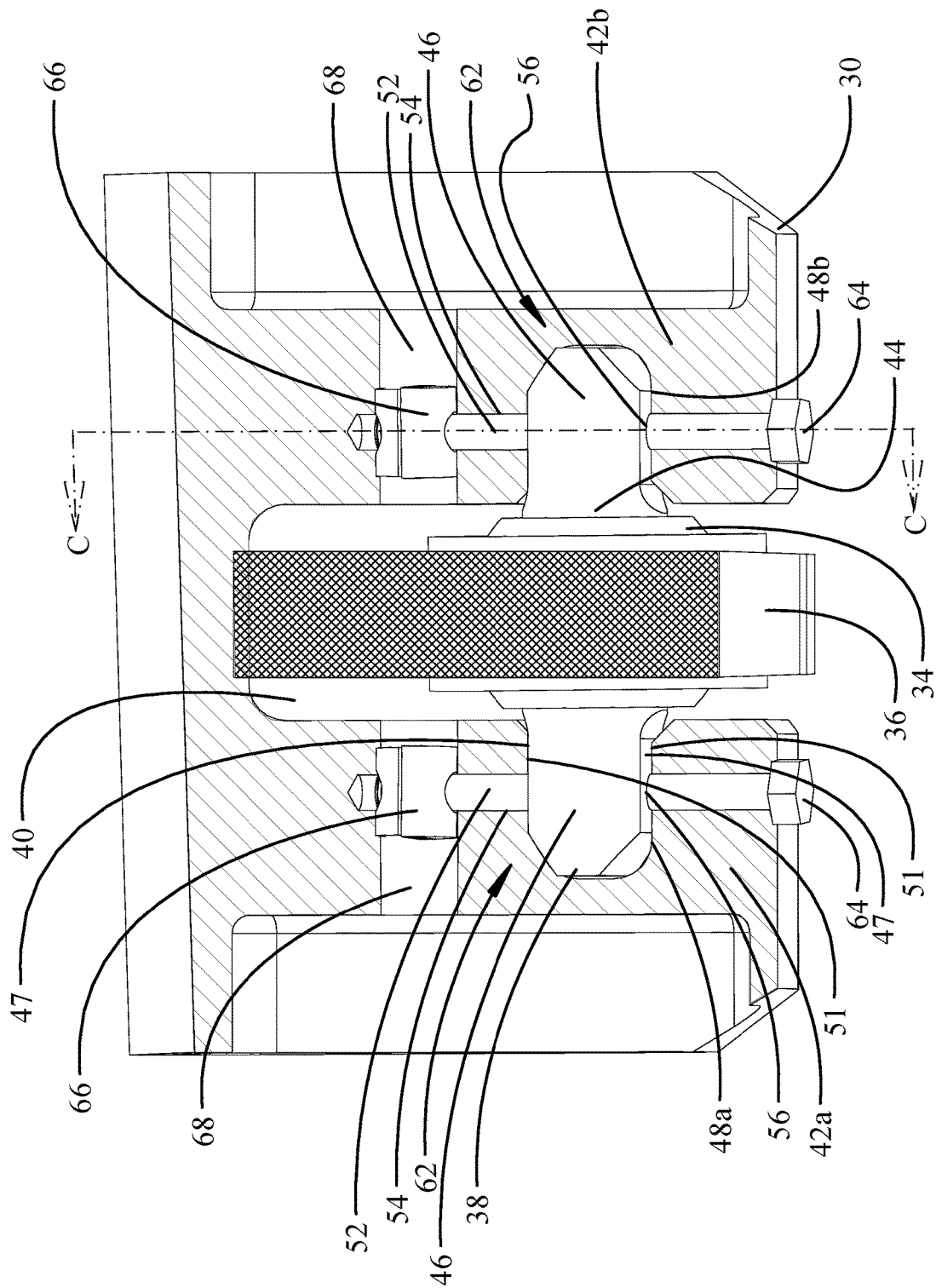
FIG. 4A is a detailed front section view for a first implementation of the flap support along line B-B of FIG. 3A showing the load pin engaged in the support slots and the fuse pin assemblies engaging the load pin and flap support.
Figure 4B:
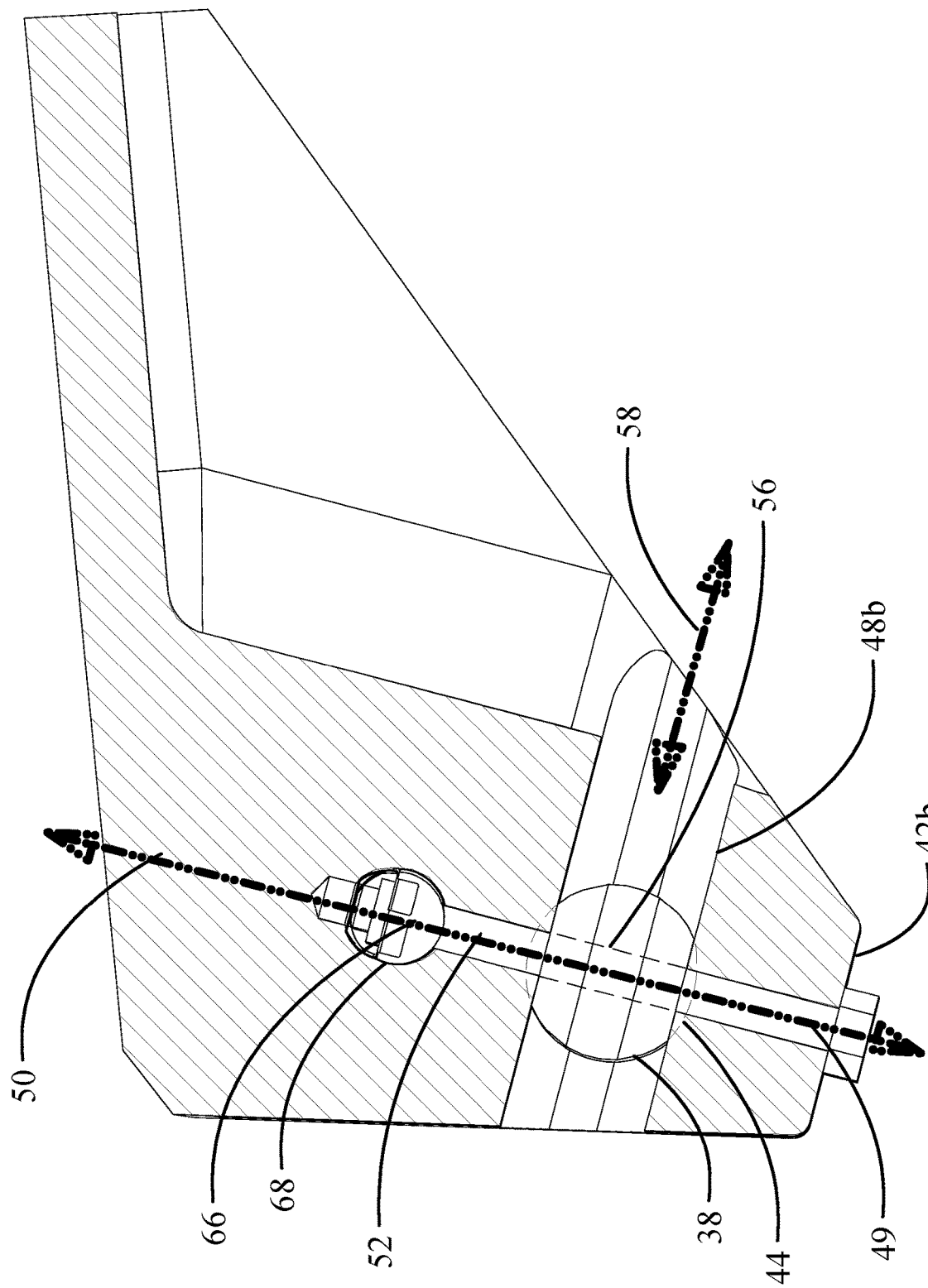
FIG. 4B is a detailed side section view of the first implementation of the flap support along line C-C of FIG. 4A showing the load pin engaged in the outboard support slot and the outboard fuse pin assembly.

As seen in FIGS. 4A and 4B, the flap support attachment fitting 30 for a first example implementation incorporates a central channel 40 between an inboard fitting extension 42a and an outboard fitting extension 42b to receive the aft lug 36 of the auxiliary flap support track 24 and the associated spherical bearing 34. The primary load pin 38 is received through and is engaged by the spherical bearing 34 on a cylindrical central portion 44. The primary load pin 38 has end portions 46 engaged in an inboard slot 48a in the inboard fitting extension 42a and an outboard slot 48b in the outboard fitting extension 42b. The primary load pin 38 provide reaction force 49 to react operating loads 50, which are primarily air loads, coupled into the flap support attachment fitting 30 by the flap 14.

The primary load pin 38 is restrained from translating along the inboard and outboard slots 48a, 48b by two transverse fuse pins 52 perpendicular to an axis 39 of the primary load pin. The fuse pins 52 are received through pin receiving bores 54 in the inboard and outboard fitting extensions 42a, 42b and mating bores 56 in the end portions 46 of the primary load pin 38. In an operating condition in which the auxiliary flap support track 24 is not jammed, mating bores 56 are concentrically aligned with the pin receiving bores 54. Additional fuse pins for redundancy may be used in alternative implementations. Inboard and outboard slots 48a, 48b are aligned with flap deployment loads 58 induced by the auxiliary flap support track 24 on the flap support attachment fitting 30 and the transverse fuse pins 52 are aligned transverse to the inboard and outboard slots 48a, 48b to react shear forces along the slots. In the example implementation shown in the drawings, end portions 46 of the primary load pin 38 have opposing flats 47 received on upper and lower surfaces 51 of the slots 48a, 48b to facilitate alignment of the pin receiving bores 54 and mating bores 56 for insertion of the fuse pins 52. The flats 47 additionally prevent rotation of the primary load pin 38 in the slots 48a, 48b to avoid rotationally induced shear loads on the fuse pins 52. The flats 47 further constrain motion of the primary load pin 38 parallel to the slots 48a, 48b during translation of the pin as described in detail subsequently.

For the first example implementation, the flap deployment loads 58 are approximately normal to the operating loads 50 and associated reaction force 49 of the primary load pin 38. The transverse fuse pins 52 are perpendicular to the inboard and outboard slots 48a, 48b and, therefore, parallel or substantially parallel to the operating loads 50 minimizing shear loading of the transverse fuse pins by the operating loads. The transverse fuse pins 52 are configured to fracture at a predetermined shear out load. In the event of a jam of the auxiliary flap support track 24, a shear out load exceeding the normal operation loads is induced between the primary load pin 38 and the flap support attachment fitting 30 causing the transverse fuse pins to fracture allowing the end portions 46 of the primary load pin 38 to translate along the inboard and outboard slots to eliminate any less-than-optimal loading on the overall flap structure. In the first implementation, the transverse fuse pins 52 are incorporated in fuse pin assemblies 62 having heads 64 at a first end of the fuse pins constraining the pins at an interface of the pin receiving bores 54. Barrel nuts 66 are received in lateral bores 68 in the fitting extensions 42a, 42b to align with the bores 54 allowing threaded engagement of the transverse fuse pins 52 to constrain the transverse fuse pins in the flap support attachment fitting 30.

Figure 5:
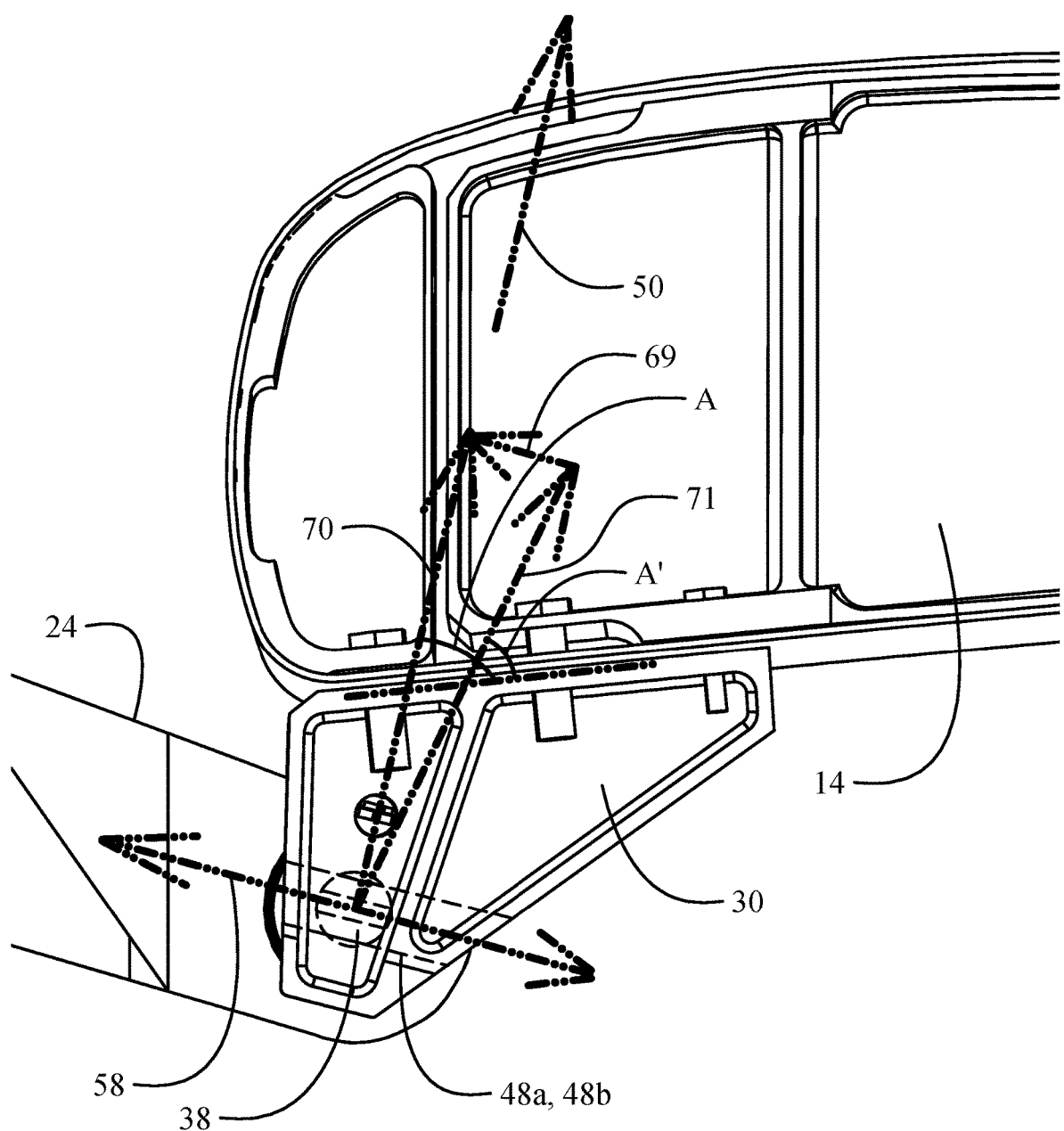
FIG. 5 is a side view of the flap support attachment demonstrating load direction variation.

For certain aircraft, flap configurations and operating conditions, a primary load direction (operating loads 50) on the primary load pin 38 may be angularly offset from a load line principal direction 70 to an offset load direction 71 by variation of the angle between the load line direction and the flap support attachment fitting 30, A to A', as seen in FIG. 5. For fuse pins with fixed alignment, the pins are now experiencing extraneous load 69 in the shear out direction aligned with deployment loads 58 during operation in which the auxiliary flap support track 24 is not jammed. This load 69 could cause less than optimal performance of the fuse pins.

Figure 6A:
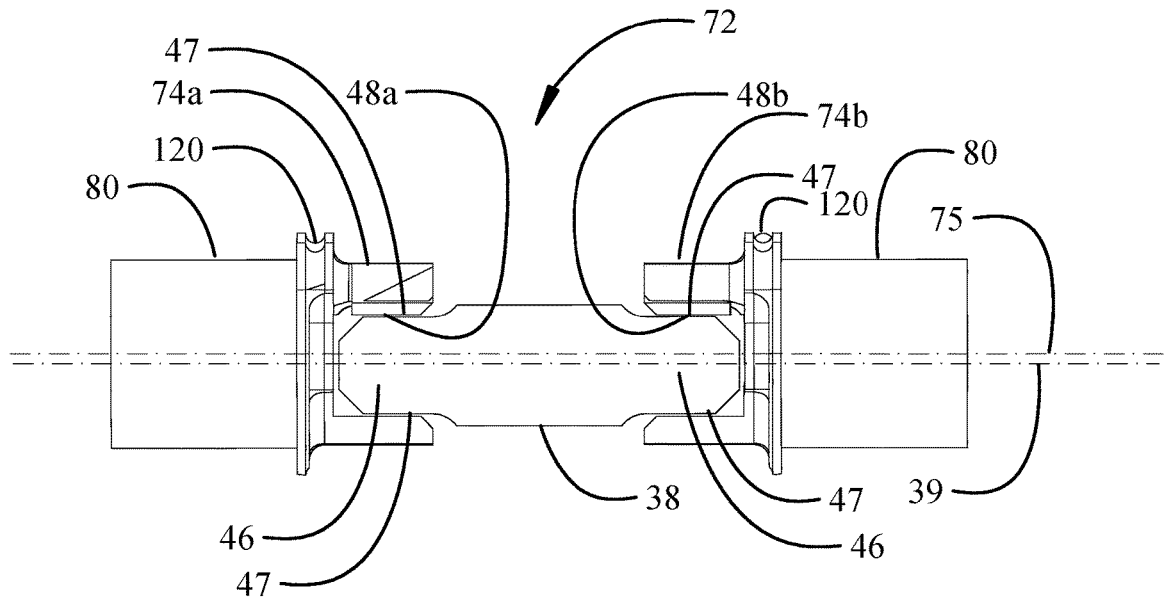
FIG. 6A is a front view of the rotating pin assembly showing the attachment claws and eccentric axes of the primary load pin.
Figure 6B:
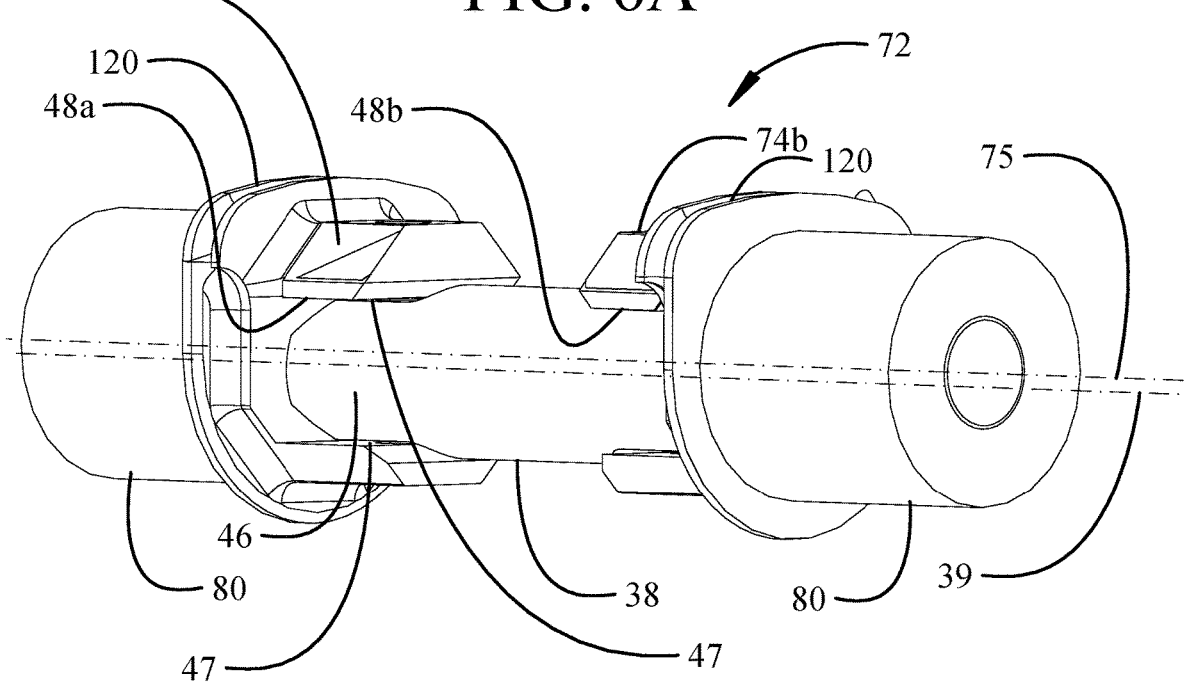
FIG. 6B is a pictorial view of the rotating pin assembly.

To accommodate this shift in the load direction, a rotatable pin assembly 72 is configured to rotate relative to the support attachment fitting. The rotating pin assembly 72 includes the primary load pin 38, and an inboard attachment claw 74a and an outboard attachment claw 74b incorporating the inboard and outboard slots 48a and 48b as seen in FIGS. 6A and 6B. A support stud 80 extends from each of the inboard and outboard attachment claws 74a, 74b. As shown in the drawings, the end portions 46 of the primary load pin 38 are engaged in the inboard and outboard slots 48a, 48b of the inboard and outboard attachment claws 74a, 74b. As in the first implementation, end portions 46 of the primary load pin 38 have opposing flats 47 received on upper and lower surfaces 51 of the slots 48a, 48b. Slots 48a and 48b are offset from a claw rotation axis 75 such that the primary load pin axis 39 is eccentric to the claw rotation axis 75 to allow self-alignment of the pin assembly 72 in response to varying offset load directions as described above.

Figure 7A:
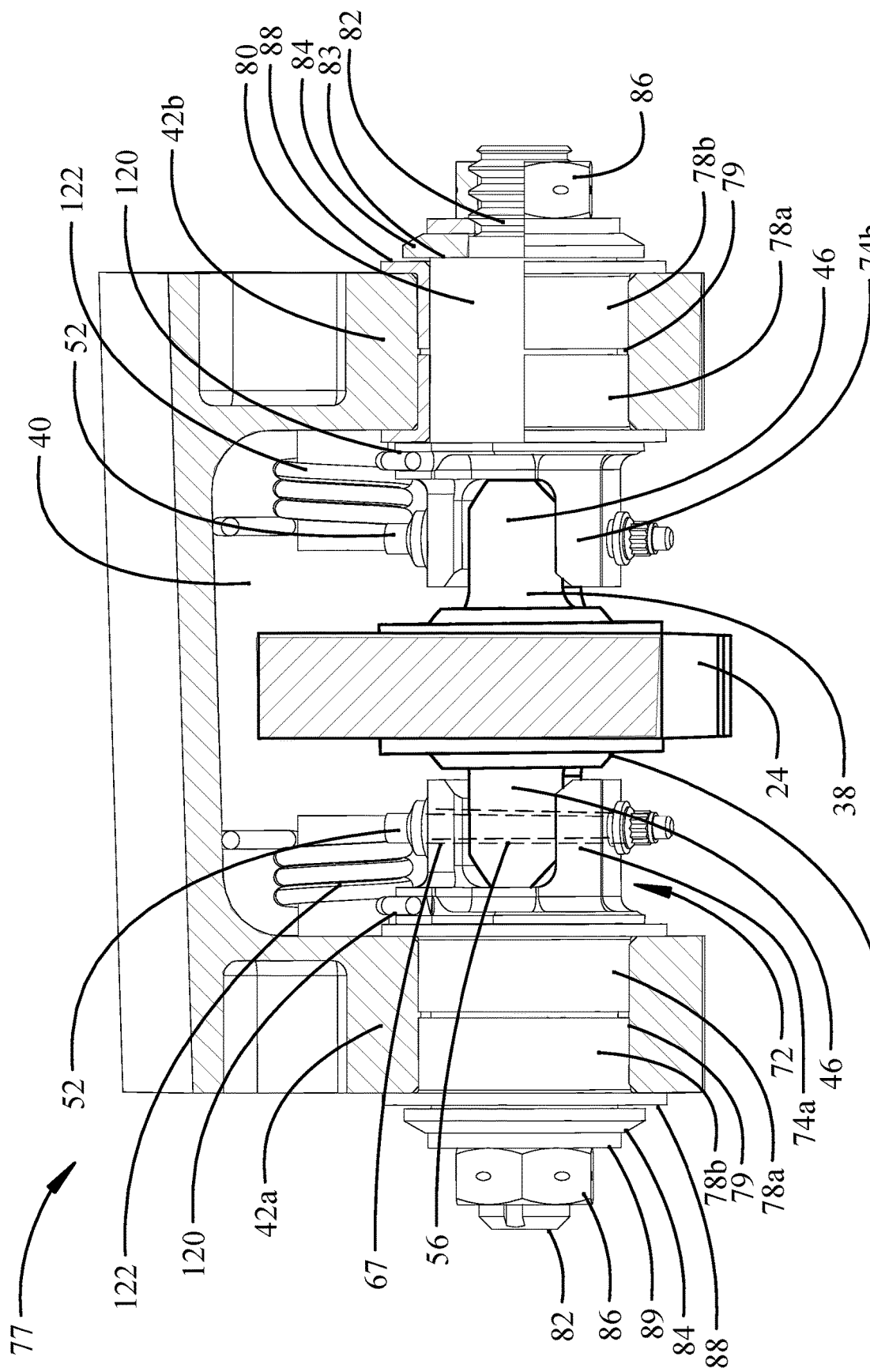
FIGS. 7A and 7B are detailed front and pictorial section views along line B-B of a second implementation incorporating the rotating pin assembly with the outboard bushings, termination segment and retention elements in quarter section to display all elements.
Figure 7B:
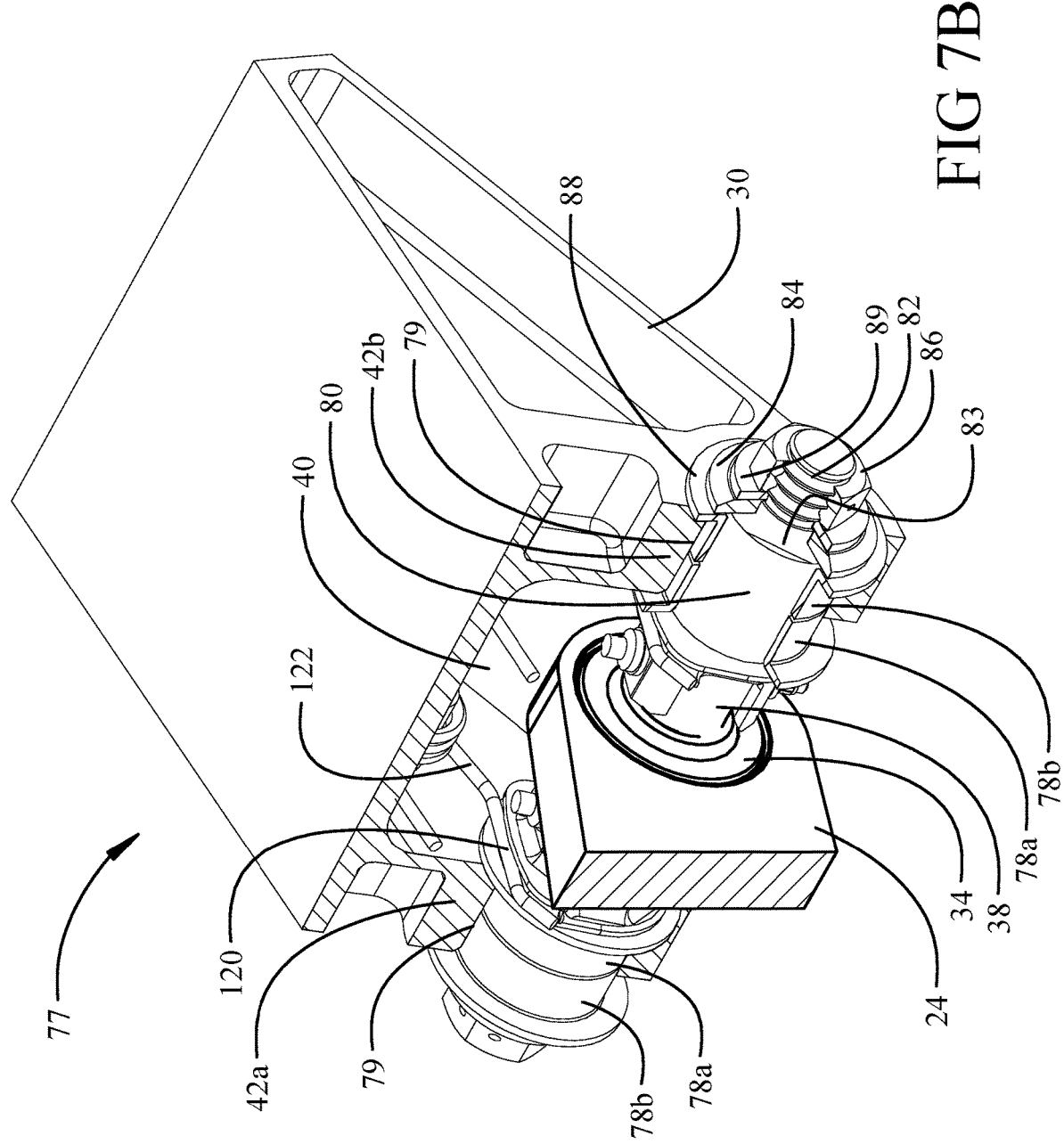

A second implementation of the flap support attachment fitting 30 employing the rotating pin assembly 72 is shown in FIGS. 7A and 7B providing a self-aligning support 77. Central channel 40 is wider than in the first implementation to accommodate the extending inboard and outboard attachment claws 74a, 74b. An inner bushing 78a and an outer bushing 78b rotatably support the pin assembly 72 in apertures 79 in each of the inboard and outboard fitting extensions 42a, 42b for rotation relative to the flap support attachment fitting 30. The support stud 80 extending from each of the inboard and outboard attachment claws 74a, 74b is received through inner bushing 78a and outer bushing 78b to rotatably secure the claws to each of the inboard and outboard fitting extensions 42a, 42b. Fuse pins 52 are perpendicular to the axis 39 of the primary load pin 38 and are received through retaining bores 67 in the inboard and outboard attachment claws 74a, 74b which align with the receiving bores 56 in the primary load pin 38. The pin assembly 72 provides for the inboard and outboard attachment claws 74a, 74b to be rotatable with respect to the flap support attachment fitting 30 while remaining rotationally fixed relative to both the primary load pin 38 and the fuse pins 52. A termination segment 82 extending from the support stud 80 configured as an axial retention element is threaded and is received through a retention washer 84 and engages a nut 86. Retention washer 84 is rotatably received on an engagement face 88 of the outer bushing 78b. A shoulder 83 on the support stud 80 at the termination segment 82 provides axial spacing to maintain a length between the inboard and outboard claws 74a, 74b to assure freedom of rotation of the pin assembly 72. Plain washers 89 may additionally be employed between the nuts 86 and retention washers 84. The inboard and outboard attachment claws 74a, 74b in the rotating pin assembly 72 are configured to rotate in the flap support attachment fitting 30 to maintain substantial alignment of the fuse pins 52 and the primary load direction, thereby minimizing any extraneous load in the shear out direction.

Figure 8A:
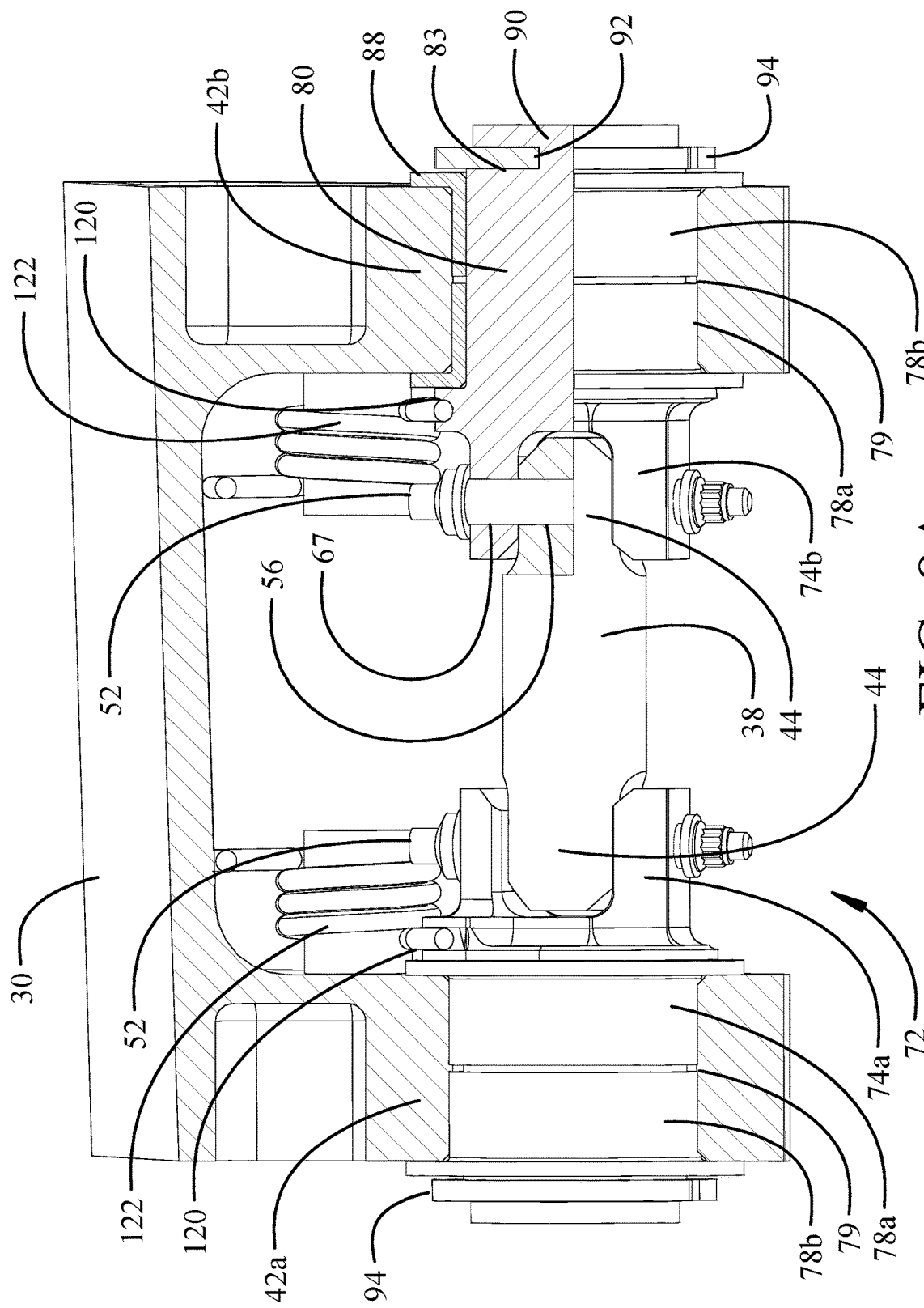
FIGS. 8A and 8B are detailed front and pictorial section views along line B-B of a third implementation incorporating the rotating pin assembly with the outboard bushings, termination segment and retention elements in quarter section to display all elements (the support track and spherical bearing removed for clarity)
Figure 8B:
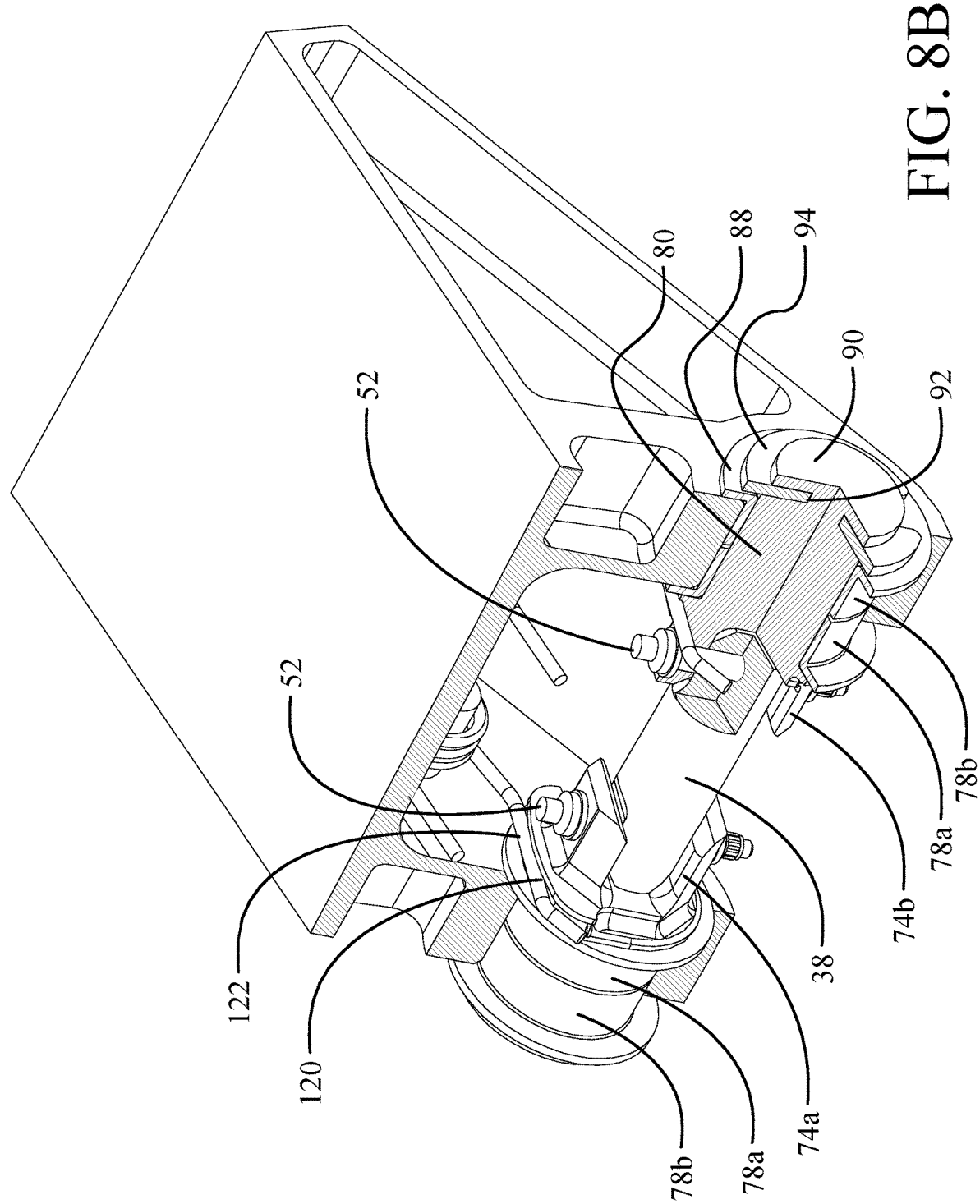

In a third implementation shown in FIGS. 8A and 8B, to simplify assembly, reduce overall width and facilitate rotation of the pin assembly 72, an alternative termination segment 90 on the support studs 80 incorporates a clip groove 92 at the shoulder 83 to receive a low-profile clip 94 to act as the axial retention element. Low-profile clip 94 is configured to react against the engagement face 88 of outer bushing 78b and may replace the retention washer 84 or the plain washer 89 to be received directly on the engagement face 88 or may be used in conjunction with one or both of the retention washer 84 or the plain washer 89, to laterally restrain the pin assembly 72.

Figure 9A:
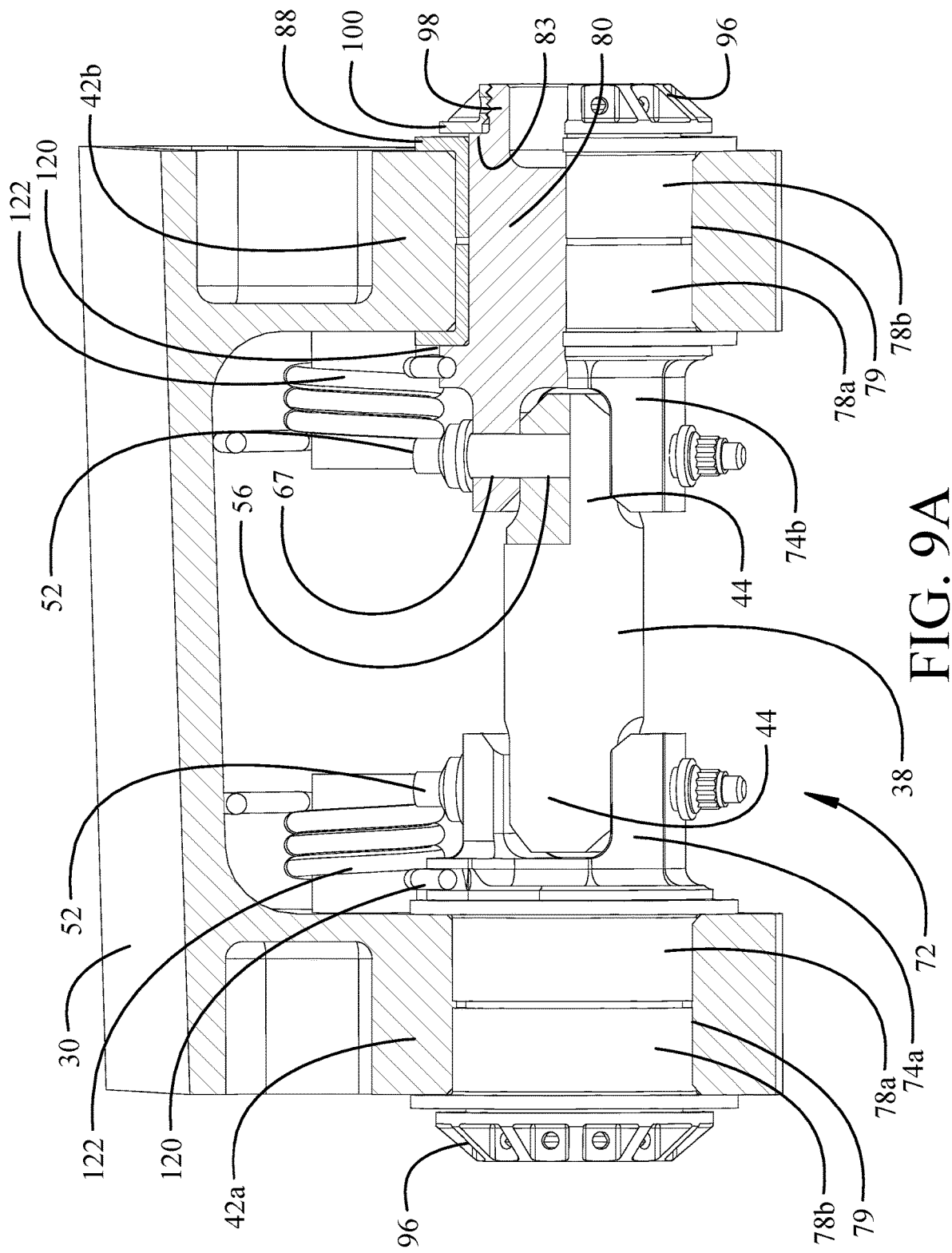
FIGS. 9A and 9B are detailed front and pictorial section views along line B-B of a fourth implementation incorporating the rotating pin assembly with the outboard bushings, termination segment and retention elements in quarter section to display all elements (the support track and spherical bearing removed for clarity)
Figure 9B:
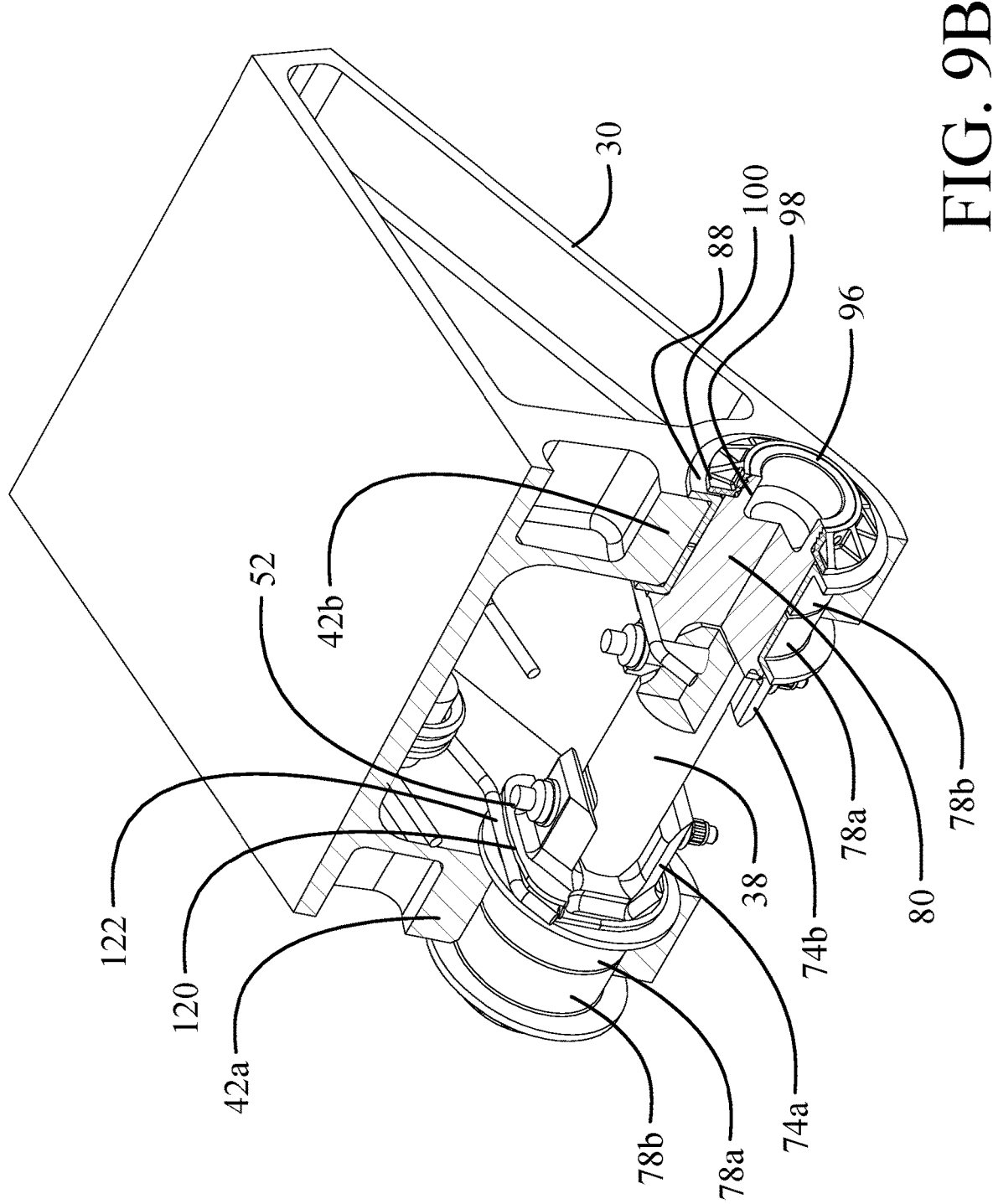

In a fourth implementation shown in FIGS. 9A and 9B, a low-profile anti-rotation nut 96 is engaged on a second alternative termination segment 98 which is externally threaded. Anti-rotation nut 96 has an integral flange 100 received against shoulder 83 and, comparable to the low-profile clip 94, directly interfaces with the engagement face 88 of outer bushing 78b to act as the axial retention element.

Figure 10A:
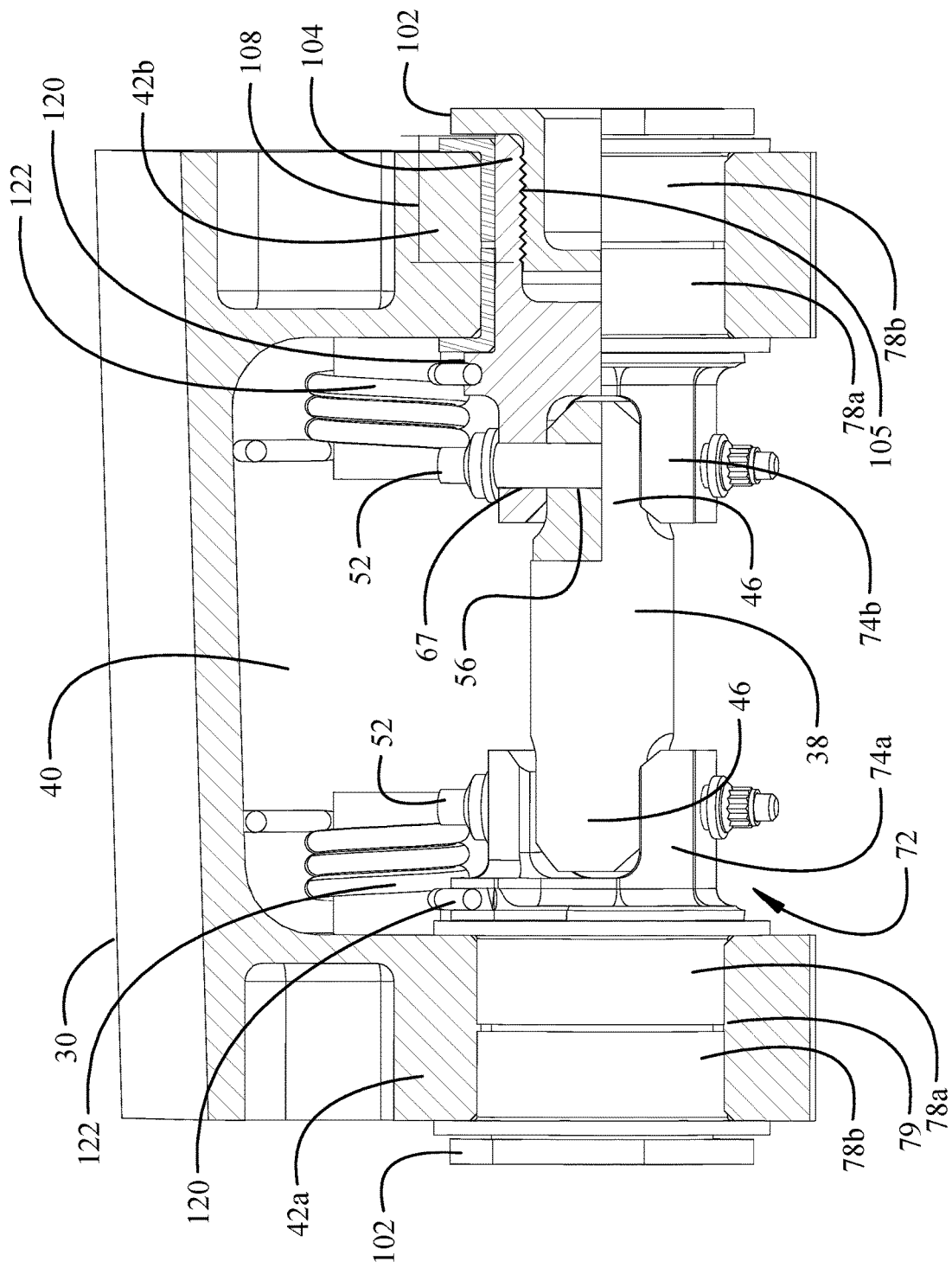
FIGS. 10A and 10B are detailed front and pictorial section views along line B-B of a fifth implementation incorporating the rotating pin assembly with the outboard bushings, termination segment and retention elements in quarter section to display all elements (the support track and spherical bearing removed for clarity)
Figure 10B:
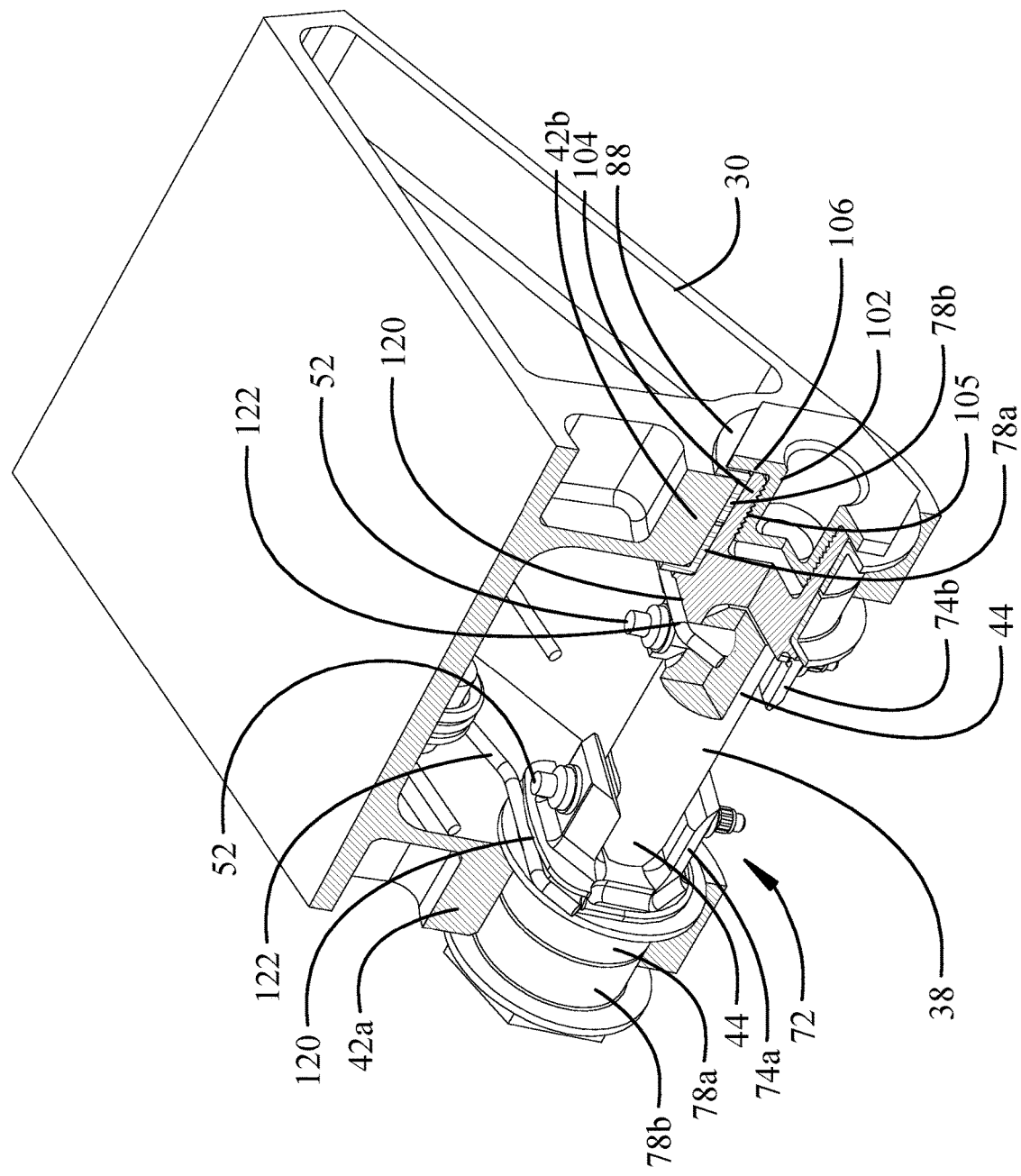

In a fifth implementation shown in FIGS. 10A and 10B, a cup nut 102 is received in a third alternative termination segment 104 having an internally threaded bore 105 to receive the threaded cup nut. An external flange 106 of the cup nut 102 is received against the engagement face 88 of the outer bushing 78b as the axial retaining element. A depth of the threaded bore 105 limits penetration of the cup nut acting as the axial spacing element to assure freedom of rotation of the pin assembly 72.

For each of the second through fifth implementations, each of the inboard and outboard attachment claws 74a, 74b include a cam surface 120 engaged by a realignment spring 122. Realignment springs 122 are engaged by the flap support attachment fitting 30 to urge the cam surfaces 120 and the inboard and outboard attachment claws 74a, 74b to a nominal position when excessive rotation of the pin assembly occurs in operations such as taxiing of the aircraft and to align the inboard and outboard claws to maintain alignment of the inboard and outboard slots 48a, 48b in the claws relative to one another during assembly operations for insertion of the primary load pin 38 and transverse fuse pins 52.

Figure 11A:
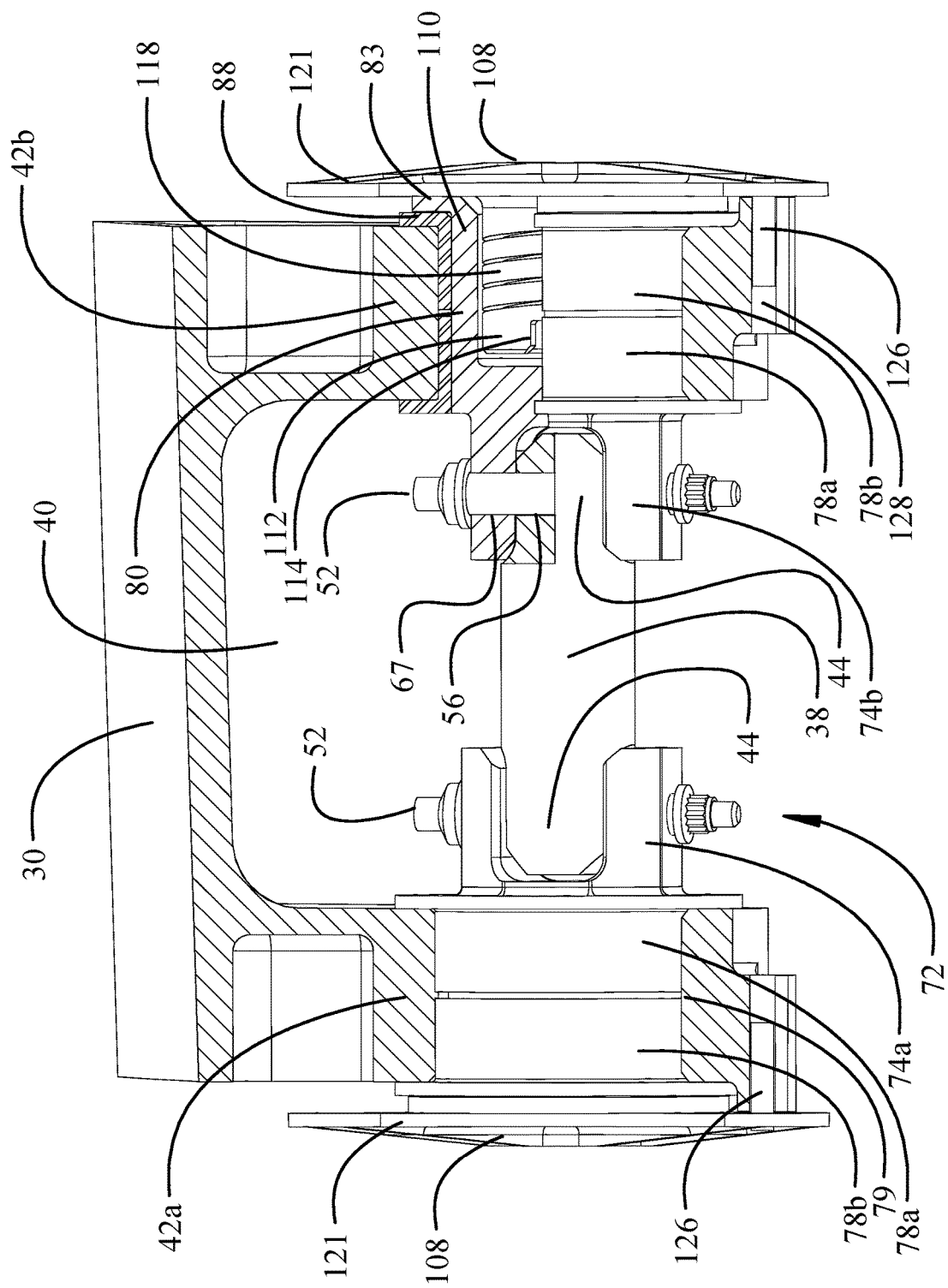
FIGS. 11A and 11B are detailed front and pictorial section views along line B-B of a sixth implementation incorporating the rotating pin assembly with the outboard bushings, termination segment and retention elements in quarter section to display all elements.
Figure 11B:
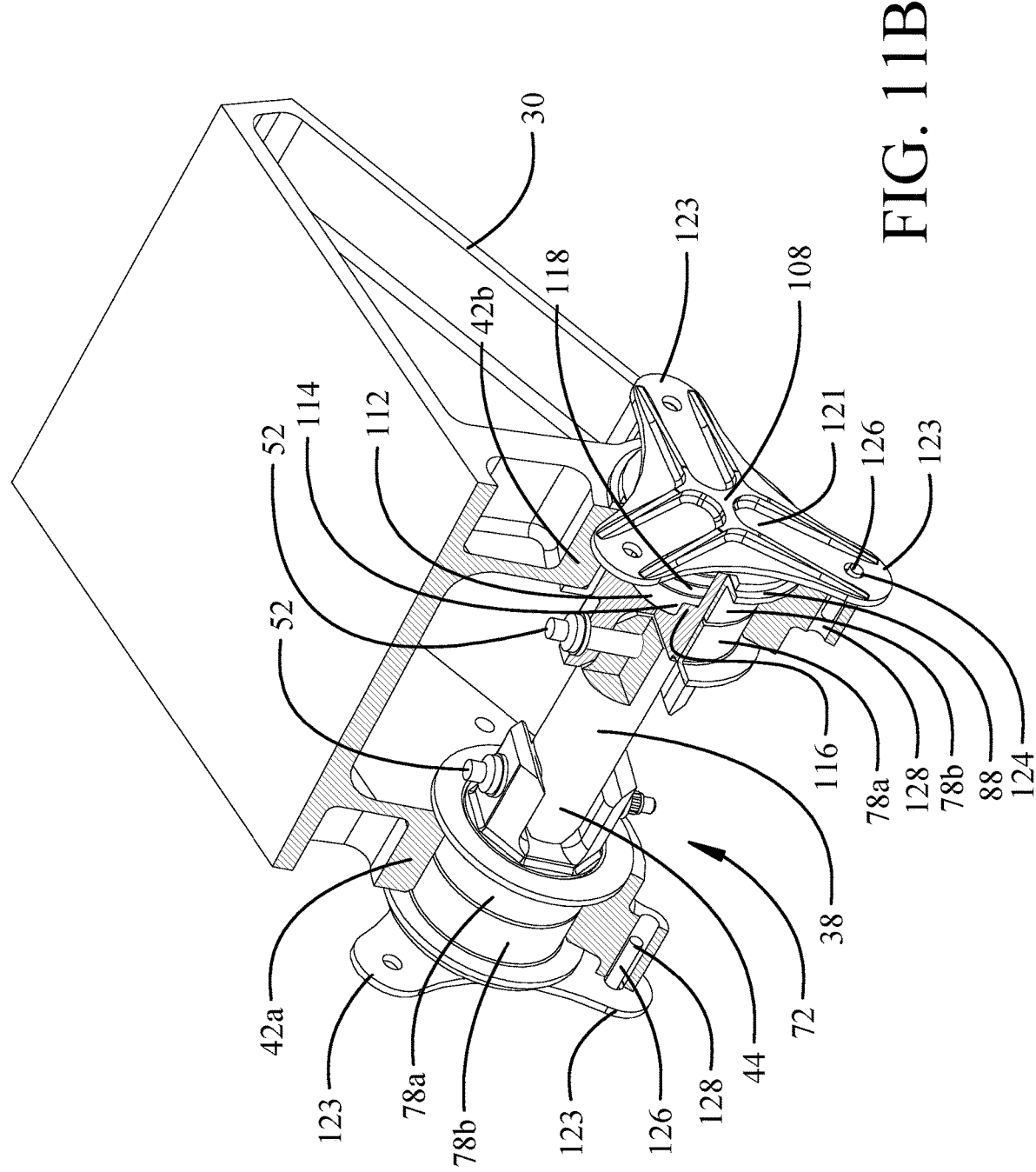

In a sixth implementation shown in FIGS. 11A and 11B, a low-profile anti-rotation cup nut 108 is received in the inner bushing 78a and outer bushing 78b in the inboard and outboard fitting extensions 42a, 42b and engaged by a fourth alternative termination segment 110. An inner end 112 of the cup nut 108 contains a slot 114 to engage a blade 116 incorporated in the termination segment 110. Unlike the second through fifth implementations, the cup nut 108 incorporates an integrated torsion spring 118. A retaining flange 121 includes spokes 123 having locking bores 124, at least one of which receives a locking pin 126 extending into a locking boss 128 in the inboard and outboard fitting extensions 42a, 42b. The locking bore 124 is concentrically aligned with the locking boss 128 to constrain the cup nut for torsional reaction of the torsion spring to rotation of the termination segment 110 as coupled by the blade 116 and slot 114. For the implementation as shown in the drawings, three spokes 123 are present each with a mating locking boss 128.

Similar to the second implementation, in each of the third through sixth implementations, the axis of the primary load pin is eccentric from the rotational axis of the inboard and outboard claws.

Figure 12A:
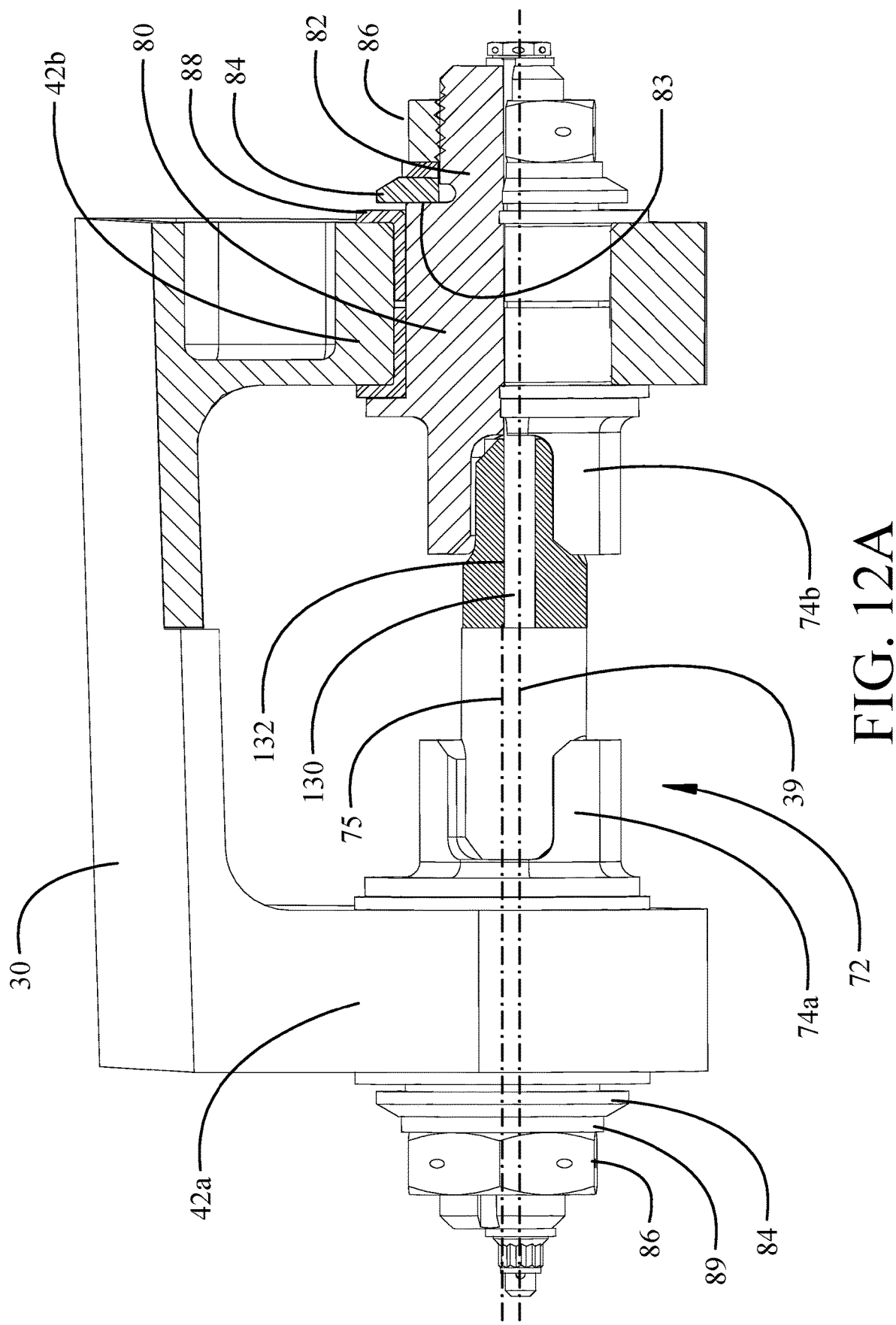
FIGS. 12A and 12B are detailed front and pictorial partial section views along line B-B of a seventh implementation incorporating the rotating pin assembly having an axial fuse pin with one bushing, termination segment and retention elements in quarter section to display all elements.
Figure 12B:
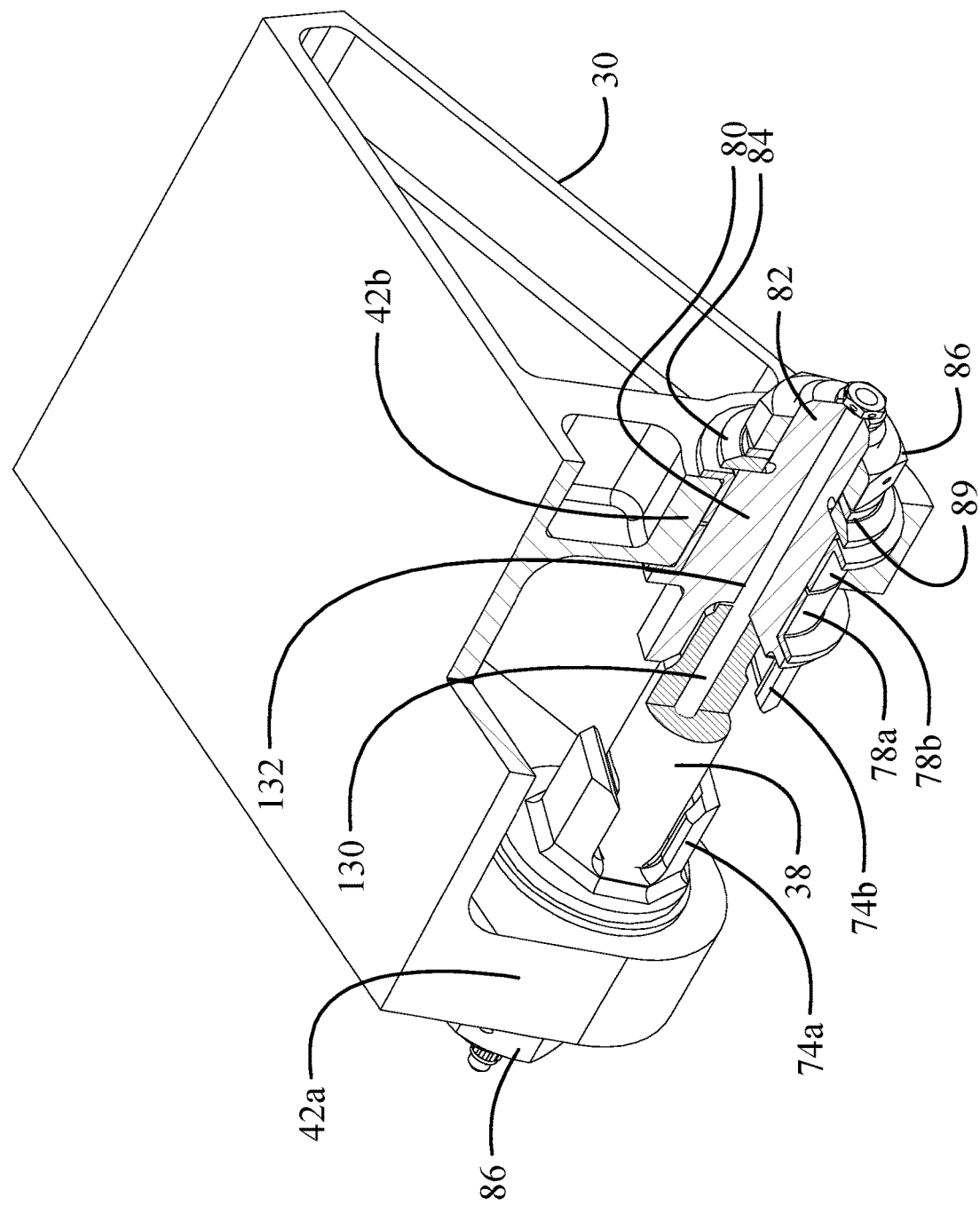

As an alternative to inserting of fuse pins 52 through concentric receiving bores 56 in the primary load pin and retaining bores 67 in the inboard and outboard claws, a seventh implementation seen in FIGS. 12A and 12B employs an axial fuse pin 130 inserted in axial bores 132 extending through the primary load pin 38, inboard and outboard attachment claws 74a, 74b, support studs 80 and inboard and outboard fitting extensions 42a, 42b. Axial fuse pin 130, as aligned with the axis 39 of primary load pin 38, is perpendicular to any offset load direction 71. Further, the alignment of the axial fuse pin 130 with the axis 39 of the primary load pin is also eccentrically offset from the claw rotation axis 75 thereby enhancing the eccentric self-alignment of the rotating pin assembly 72. As in the second implementation, termination segment 82 of the support stud 80 is threaded and is received through a retention washer 84 and engages a nut 86 as the axial retention element. Retention washer 84 is received on an engagement face 88 of the outer bushing 78b. Shoulder 83 on the support stud 80 at the termination segment 82 provides the axial spacing element to assure freedom of rotation of the pin assembly 72. Plain washers 89 may additionally be employed between the nuts 86 and retention washers 84. Rotation of the pin assembly 72 substantially maintains the inboard and outboard slots parallel to the shear out direction 69.

Figure 13A:
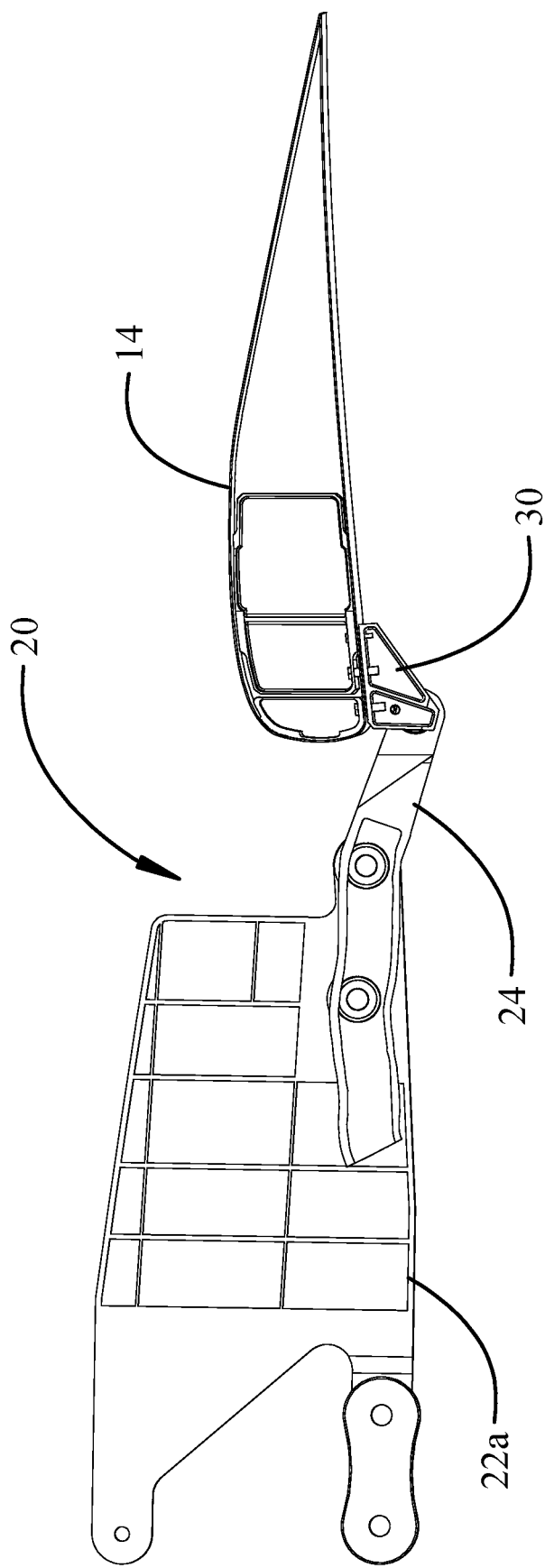
FIG. 13A-C are lower front pictorial view of the flap and flap support attach fitting sequentially disengaging from the track after fracture of the one or more fuse pins and exit of the load pin from the support slots aft during deployment of the flap.
Figure 13B:
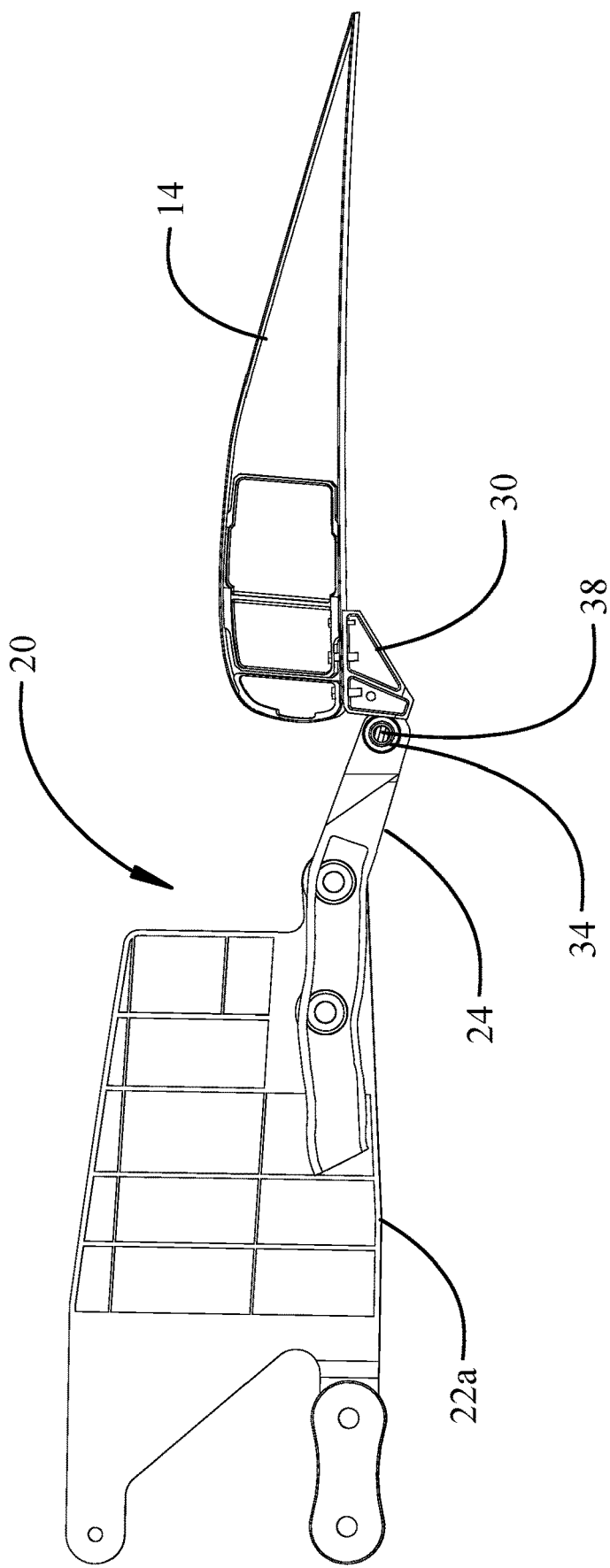
Figure 13C:
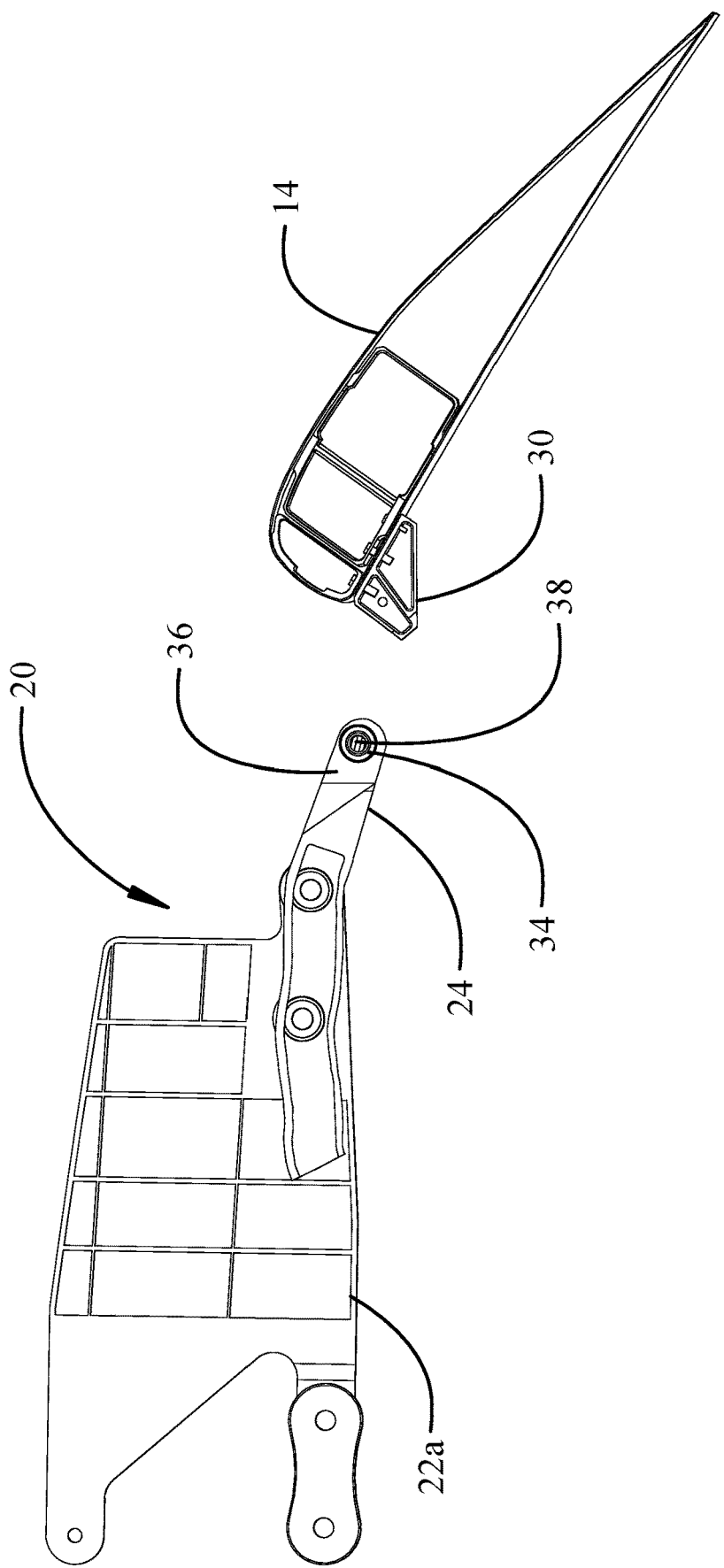
Figure 14A:
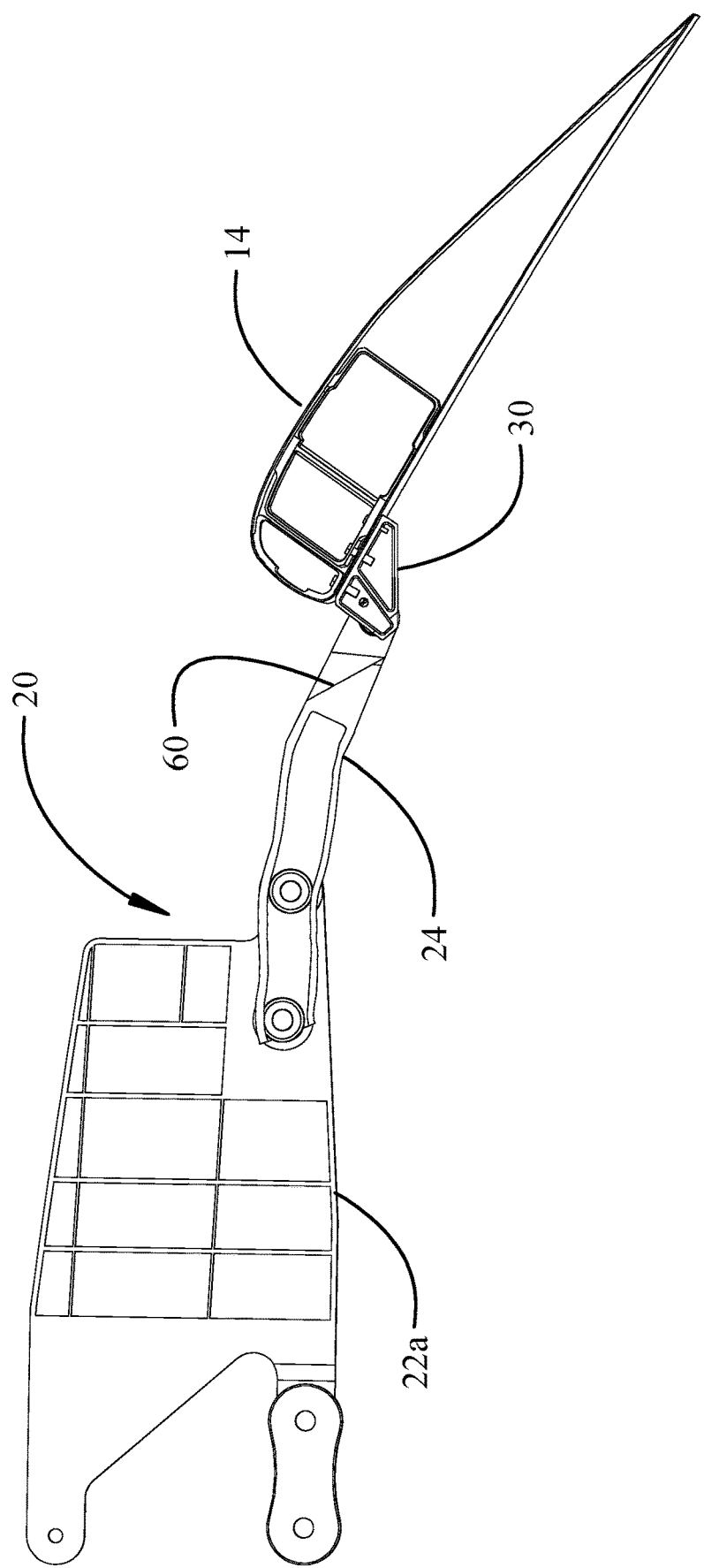
FIG. 14A-C are lower front pictorial views of the flap and flap support disengaging from the track after fracture of the one or more fuse pins and exit of the load pin from the support slots forward during retraction of the flap with the flap support attach fitting engaging the jam ramp on the track; and, FIG. 15 is a flow chart of a method for fusing of shear out loading on a flap support attachment fitting and accommodating variation in load direction using the exemplary implementations.
Figure 14B:
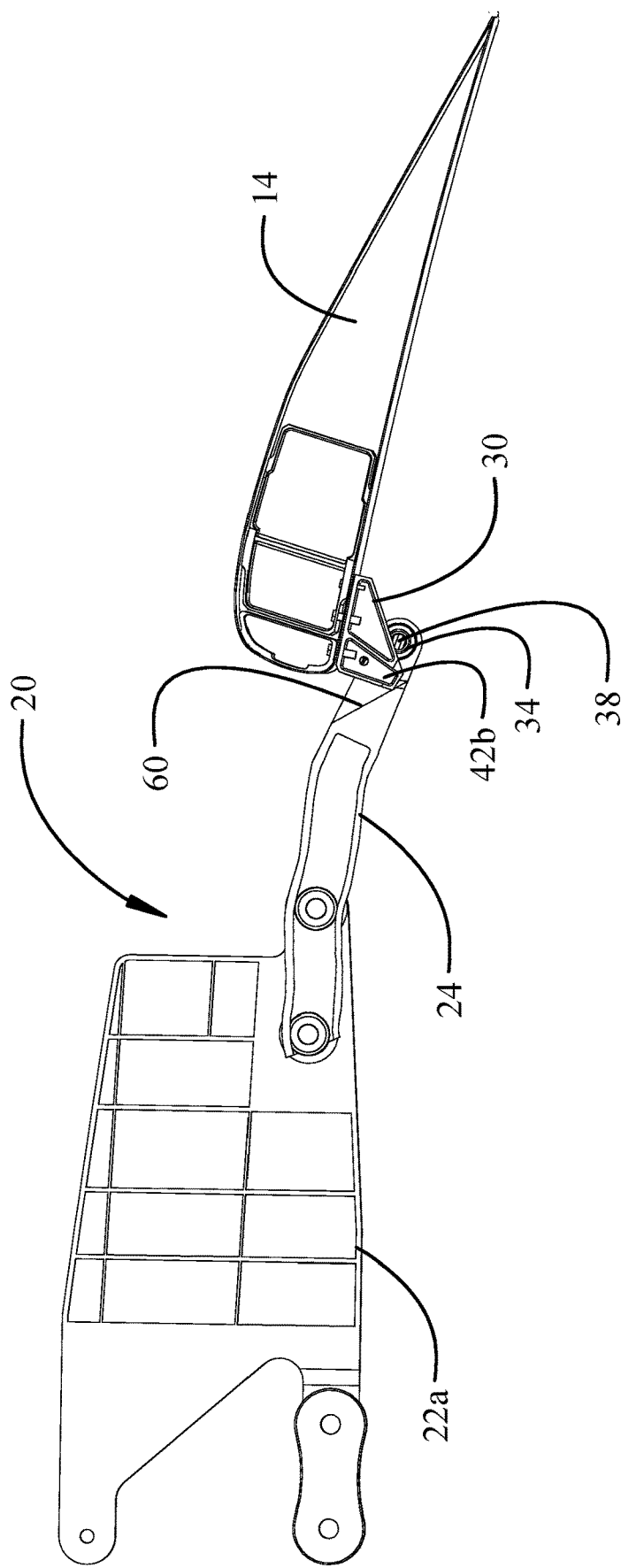
Figure 14C:
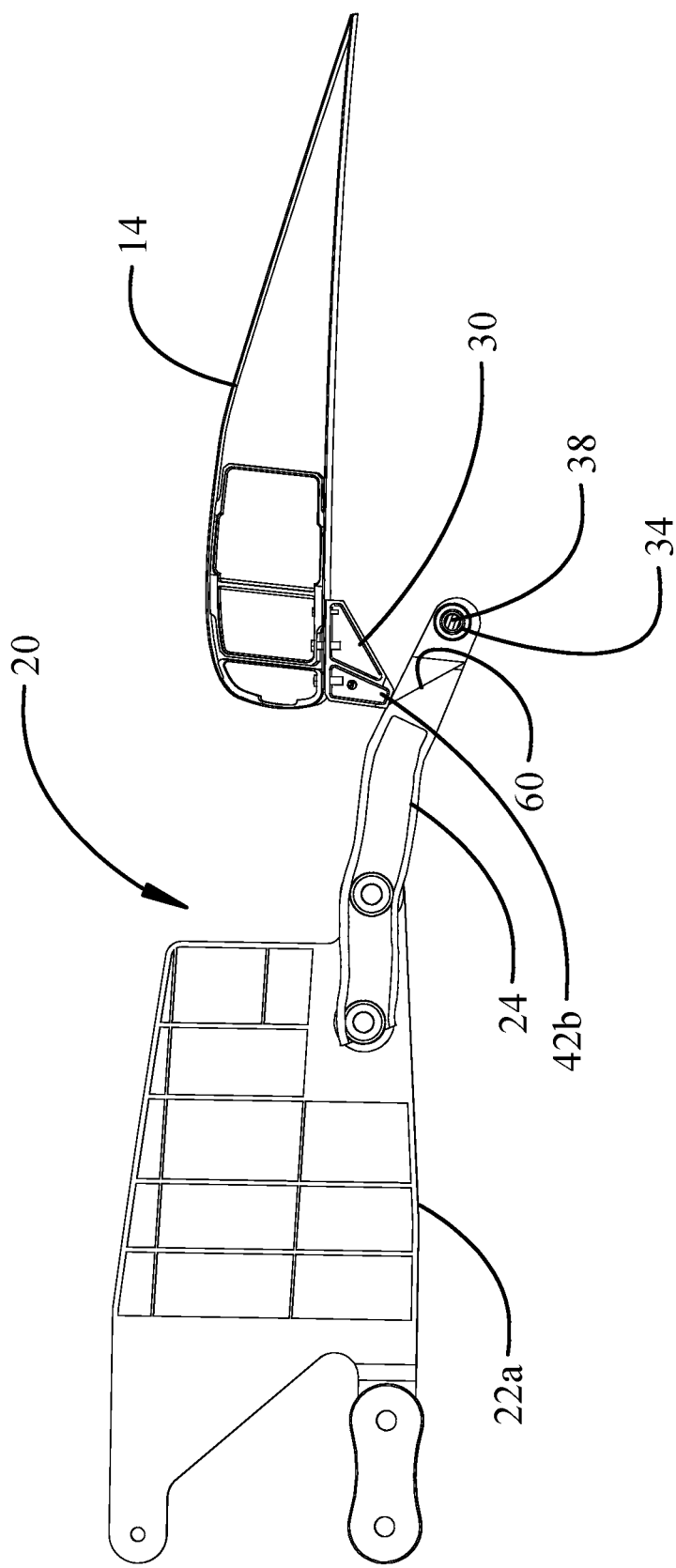

For each of the described implementations, in a condition where a jam occurs as the flap 14 is being deployed, the jammed auxiliary flap support track 24 constrains the primary load pin 38 in the spherical bearing 34 drawing the end portions 46 forward through the slots to exit the flap support attachment fitting 30 at the forward end of the slots 48a, 48b allowing the flap 14 to continue to deploy as depicted in FIGS. 13A-13C. In a condition where the flap 14 is being retracted from a deployed position and the auxiliary flap support jams as depicted in FIGS. 14A-14C, the aft lug 36 constrains the primary load pin 38 in the spherical bearing 34 urging the end portions 46 aft through the slots 48a, 48b to exit the flap support attachment fitting 30 at the aft end of the slots allowing the flap to continue to retract. A ramp 60 is employed for engaging the flap support attachment fitting in a jam condition. As best seen in FIG. 3B, the ramp 60 on the auxiliary flap support track 24 proximate the aft lug 36 engages the inboard and outboard fitting extensions, 42a, 42b to direct the flap support attachment fitting 30 over the jammed auxiliary flap support track 24 to allow retraction of the flap 14. Contrary to typical single pin joints between auxiliary support tracks and flap support attachment fittings, which are designed for using capability with fusing loads at or equal to ultimate flight loads or actuator torque break settings, the present implementations primarily accommodate load capability in the primary load pin to react flap operating loads. Shear out during track jam by fracturing the fuse pins can thus occur at a much lower stress level whereby the overall support structure is not sized by jam loads and overall weight can be significantly reduced.

Figure 15:
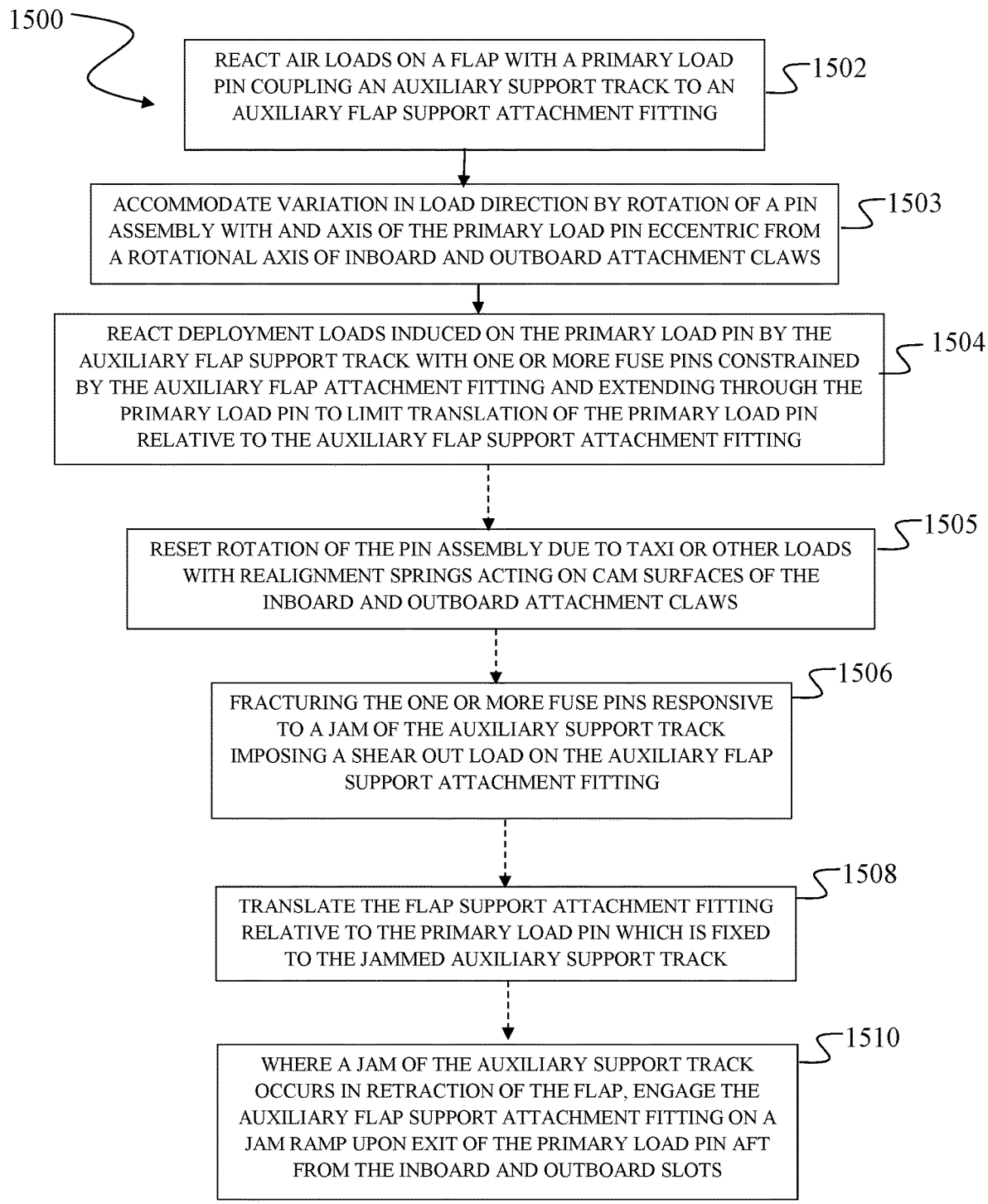

The implementations disclosed herein provide a method 1500 for fusing of shear out loading on a flap support attachment fitting and accommodating variation in load direction as shown in FIG. 15. Operating loads on a flap 14 are reacted with a primary load pin 38 coupling an auxiliary flap support track 24 to a flap support attachment fitting 30 with inboard and outboard attachment claws 74a, 74b having inboard and outboard slots 48a, 48b, step 1502. Variation in load direction is accommodated by rotation of a pin assembly 72 with an axis 39 of the primary load pin 38 eccentric from a rotational axis 75 of the inboard and outboard attachment claws 74a, 74b supporting the primary load pin, step 1503. Flap deployment loads 58 induced on the primary load pin 38 by the auxiliary flap support track 24 are reacted with transverse fuse pins 52 or an axial fuse pin 130 extending through the primary load pin 38 to limit translation of the primary load pin relative to the flap support attachment fitting, step 1504.

The method 1500 may continue with one or more optional steps, as shown in FIG. 15. Within the example implementations, resetting of rotation of the pin assembly 72 due to taxi or other loads is accomplished with realignment springs 122 acting on cam surfaces 120 of the inboard and outboard attachment claws 74a, 74b, step 1505.

Within the example implementations, the transverse fuse pins 52 or axial fuse pin 130 fracture responsive to a jam of the auxiliary flap support track 24 imposing a shear out load on the flap support attachment fitting 30, step 1506. The primary load pin 38 is then free to translate in the inboard and outboard slots 48a, 48b, step 1508. Where a jam of the auxiliary flap support track 24 occurs in retraction of the flap 14, the flap support attachment fitting 30 is engaged on a ramp 60 upon exit of the primary load pin 38 aft from the inboard and outboard slots 48a, 48b, step 1510. Operating loads 50 reacted by the primary load pin are normal or substantially normal to the inboard and outboard slots 48a, 48b and shear loads in the direction of deployment loads 58 reacted by the transverse fuse pins 52 are aligned or substantially aligned with the inboard and outboard slots 48a, 48b.

Having now described various implementations of the invention in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

What is claimed is:
1. A self-aligning support comprising:
   a support attachment fitting;
   a rotatable pin assembly having
      a primary load pin coupling the support attachment fitting to an attachment support, and inboard and outboard attachment claws engaged to opposite end portions of the primary load pin, the rotatable pin assembly configured to rotate relative to the support attachment fitting; and at least one frangible fuse pin extending through the primary load pin to limit translation of the primary load pin relative to the inboard and outboard claws.

2. A self-aligning support comprising:

a support attachment fitting;

a rotatable pin assembly having a primary load pin coupling the support attachment fitting to an attachment support, and inboard and outboard attachment claws engaged to end portions of the primary load pin, the rotatable pin assembly configured to rotate relative to the support attachment fitting, wherein the inboard and outboard attachment claws each have a support stud received in a bushing in apertures in an inboard fitting extension and an outboard fitting extension to rotatably support the pin assembly for rotation relative to the support attachment fitting; and at least one fuse pin extending through the primary load pin to limit translation of the primary load pin relative to the inboard and outboard claws.

3. The self-aligning support as defined in claim 2 wherein the primary load pin is engaged in inboard and outboard slots in the inboard and outboard claws.

4. The self-aligning support as defined in claim 3 wherein an axis of the primary load pin is eccentric from a rotational axis of the inboard and outboard claws.

5. The self-aligning support as defined in claim 2, wherein the at least one fuse pin is configured to fracture when subject to a shear out load, said primary load pin translating in the inboard and outboard slots upon shearing of the at least one fuse pin.

6. The self-aligning support as defined in claim 5 further comprising an auxiliary flap support track extendable from the attachment support and a spherical bearing mounted in the auxiliary flap support track wherein the primary load pin is received through the spherical bearing and has end portions with opposing flats received on upper and lower surfaces of the inboard and outboard slots.

7. The self-aligning support as defined in claim 5 further comprising bushings in fitting extensions of the support attachment fitting, said bushings rotatably receiving support studs extending from the inboard and outboard attachment claws enabling rotation of the pin assembly.

8. The self-aligning support of claim 2, wherein the at least one fuse pin comprises:

a first fuse pin extending through a first receiving bore in the primary load pin substantially perpendicular to an axis of the primary load pin; and a second fuse pin extending through a second receiving bore in the primary load pin substantially perpendicular to the axis of the primary load pin.

9. The self-aligning support as defined in claim 8 wherein the attachment support comprises an auxiliary flap support track and the inboard and outboard slots are aligned with flap deployment loads induced by the auxiliary flap support track on the support attachment fitting and the first and second fuse pins are aligned transverse to the inboard and outboard slots to react shear forces along the inboard and outboard slots.

10. The self-aligning support as defined in claim 8 wherein the first and second fuse pins are incorporated in fuse pin assemblies having heads at a first end of the first and second fuse pins constraining the first and second fuse pins at an interface of a retaining bore in the inboard attachment claw and an interface of a retaining bore in the outboard attachment claw; and, nuts to align with the pin retaining bores allowing threaded engagement of the first and second fuse pins to constrain the first and second fuse pins in the inboard and outboard attachment claws.

11. The self-aligning support of claim 2, wherein the at least one fuse pin comprises a fuse pin extending through the inboard attachment claw, outboard attachment claw, and the primary load pin, the fuse pin substantially parallel to an axis of the primary load pin.

12. The self-aligning support as defined in claim 2, wherein the attachment support comprises an auxiliary flap support track and further comprising a ramp on the auxiliary flap support track, the ramp engaging the flap support attachment fitting in a jam condition upon translation of the primary load pin out of an aft end of the inboard and outboard slots.

13. The self-aligning support as defined in claim 2 wherein a termination segment extends from the support stud, said termination segment threaded and received through a retention washer and engaging a nut, said retention washer received on an engagement face of the bushing, the support stud having a shoulder at the termination segment configured to provide axial spacing to maintain a length between the inboard or outboard claw and the nut to assure freedom of rotation of the pin assembly.

14. The self-aligning support as defined in claim 2 wherein a termination segment on the support stud incorporates a clip groove at a shoulder to receive a low-profile clip, said clip urged against an engagement face of the bushing to laterally restrain the pin assembly.

15. The self-aligning support as defined in claim 2 wherein a termination segment on the support stud is externally threaded and is engaged in a low-profile anti-rotation nut, said anti-rotation nut having an integral flange received against a shoulder on the support stud and interfacing with an engagement face of the bushing.

16. The self-aligning support as defined in claim 2 wherein a termination segment on the support stud has an internally threaded bore to receive a cup nut, an external flange of the cup nut is received against an engagement face of the bushing and a depth of the threaded bore limits penetration of the cup nut.

17. The self-aligning support as defined in claim 2 wherein a low-profile anti-rotation cup nut is received in the bushing, an inner end of the cup nut contains a slot to engage a blade extending from a termination segment on the support stud, said cup nut incorporating an integrated torsion spring and a retaining flange including spokes having locking bores, at least one locking bore receiving a locking pin extending into a locking boss in the inboard and outboard fitting extensions whereby the locking bore is concentrically aligned with the locking boss to constrain the cup nut for torsional reaction of the torsion spring to rotation of the termination segment.

18. A method for fusing of shear out loading on a flap support attachment fitting and accommodating variation in load direction, said method comprising:

reacting operating loads on a flap with a primary load pin coupling an attachment support to a flap support attachment fitting with inboard and outboard attachment claws, wherein the inboard and outboard attachment claws each have a support stud received in a bushing in apertures in an inboard fitting extension and an outboard fitting extension to rotatably support a pin assembly for rotation relative to the support attachment fitting;

rotating the pin assembly with an axis of the primary load pin eccentric from a rotational axis of the inboard and outboard attachment claws to accommodate variation in load direction; and reacting flap deployment loads induced on the primary load pin with at least one fuse pin extending through the primary load pin to limit translation of the primary load pin relative to the flap support attachment fitting.

19. The method as defined in claim 18 further comprising:

fracturing the at least one fuse pin responsive to a jam imposing a shear out load on the flap support attachment fitting; and, translating the primary load pin in inboard and outboard slots in the inboard and outboard attachment claws.

20. The method of claim 18 wherein the step of reacting operating loads on a flap comprises reacting operating loads substantially normal to the inboard and outboard slots with the primary load pin and wherein the step of reacting flap deployment loads comprises reacting shear loads substantially aligned with inboard and outboard slots with the at least one fuse pin.

* * * * *